United States Patent
Lyu et al.

(10) Patent No.: US 12,342,387 B2
(45) Date of Patent: Jun. 24, 2025

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Ling Lyu, Shanghai (CN); Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/796,935

(22) Filed: Aug. 7, 2024

(65) Prior Publication Data

US 2025/0031251 A1 Jan. 23, 2025

Related U.S. Application Data

(63) Continuation of application No. PCT/CN2023/108694, filed on Jul. 21, 2023.

(51) Int. Cl.
*H04W 74/0833* (2024.01)
*H04W 24/08* (2009.01)

(52) U.S. Cl.
CPC ....... *H04W 74/0833* (2013.01); *H04W 24/08* (2013.01)

(58) Field of Classification Search
CPC .......................... H04W 74/0833; H04W 24/08
See application file for complete search history.

(56) References Cited

U.S. PATENT DOCUMENTS

| | | | |
|---|---|---|---|
| 2015/0245387 A1* | 8/2015 | Park | H04W 74/0833 |
| 2017/0251460 A1 | 8/2017 | Agiwal et al. | |
| 2018/0324716 A1* | 11/2018 | Jeon | H04W 74/0833 |
| 2019/0394805 A1 | 12/2019 | Kim et al. | |
| 2020/0229243 A1 | 7/2020 | Jiang | |

(Continued)

FOREIGN PATENT DOCUMENTS

| | | |
|---|---|---|
| CN | 111629446 | 9/2020 |
| CN | 113994759 | 1/2022 |

(Continued)

OTHER PUBLICATIONS

China Telecom, "Revised WID on Further NR coverage enhancements," 3GPP TSG RAN Meeting #96, RP-221858, Budapest, Hungary, Jun. 6-9, 2022, 5 pages.

(Continued)

*Primary Examiner* — Chuong M Nguyen
(74) *Attorney, Agent, or Firm* — Fish & Richardson P.C.

(57) ABSTRACT

A method for a node used for wireless communication and an apparatus are provided. The method includes: transmitting X1 first random access preambles, wherein X1 is a positive integer; monitoring control signaling of a first random access response during a first time window, wherein the first random access response corresponds to the X1 first random access preambles; based on a result of the monitoring control signaling, incrementing a counter by 1; and transmitting X2 second random access preambles, wherein X2 is a positive integer greater than or equal to X1, wherein X2 is determined based on a first parameter and whether the counter is greater than a threshold, wherein the threshold is a positive integer.

20 Claims, 5 Drawing Sheets

(56) References Cited

U.S. PATENT DOCUMENTS

| | | | |
|---|---|---|---|
| 2021/0219349 A1 | 7/2021 | Huang | |
| 2021/0243810 A1* | 8/2021 | Turtinen | H04W 74/0833 |
| 2023/0125994 A1* | 4/2023 | Xiong | H04L 1/0061 |
| | | | 370/330 |
| 2023/0254746 A1* | 8/2023 | Wu | H04W 36/0085 |
| | | | 370/331 |

FOREIGN PATENT DOCUMENTS

| | | | |
|---|---|---|---|
| CN | 115696623 | 2/2023 | |
| CN | 116367347 | 6/2023 | |
| WO | WO 2016109982 | 7/2016 | |
| WO | WO 2023059094 | 4/2023 | |
| WO | WO-2023059094 A1 * | 4/2023 | H04W 74/002 |

OTHER PUBLICATIONS

International Search Report and Written Opinion in International Appln. No. PCT/CN2023/108694, mailed on Mar. 7, 2024, 19 pages (with English machine translation).

Office Action in Chinese Appln. No. 202380011743.6, mailed on Jun. 19, 2024, 15 pages (with English machine translation).

Samsung, "RA Preamble Transmission for Coverage Enhancements," 3GPP TSG RAN WG1 #81, R1-152838, Fukuoka, Japan, May 25-29, 2015, 3 pages.

Samsung, "RA Preamble Transmission for Rel-13 Low Cost Ues," 3GPP TSG RAN WG1 #80bis, R1-151596, Belgrade, Serbia, Apr. 20-24, 2015, 3 pages.

Notice of Allowance in Chinese Appln. No. 202380011743.6, mailed on Aug. 16, 2024, 11 pages (with English machine translation).

* cited by examiner

METHOD FOR NODE USED FOR WIRELESS COMMUNICATION AND APPARATUS

CROSS-REFERENCE TO RELATED APPLICATIONS

This application is a continuation of International Application No. PCT/CN2023/108694, filed on Jul. 21, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

To enhance coverage performance of random access, it is planned to introduce a retransmission based on multiple physical random access channel (PRACH) transmissions to some communications systems (for example, new radio (NR) systems), and a solution of increasing a PRACH transmission quantity during a retransmission by using a backoff mechanism is discussed. However, in a case that a plurality of nodes increase PRACH transmission quantities from relatively small values to relatively large values based on a backoff mechanism, a resource conflict may be caused due to resource allocation of a retransmission of multiple PRACH transmissions, and a backoff mechanism conflict of the multiple PRACH transmissions may also be caused. This severely affects access performance of a system.

SUMMARY

Embodiments of the present application provide a method for a node used for wireless communication and an apparatus. The following describes aspects of the present application.

According to a first aspect, a method for a first node used for wireless communication is provided, including: transmitting X1 first random access preambles, where X1 is a positive integer; monitoring control signaling of a first random access response during a first time window, where the first random access response corresponds to the X1 first random access preambles; incrementing a first counter by X1, and/or incrementing a second counter by 1; and transmitting X2 second random access preambles, where X2 is a positive integer greater than or equal to X1; and a first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In an implementation, control signaling of a second random access response is monitored during a second time window, where the second random access response corresponds to the X2 second random access preambles.

In an implementation, a third random access response is received, where the third random access response includes at least one random access preamble identifier, and no random access preamble identifier of the at least one random access preamble identifier contained in the third random access response corresponds to a preamble index of the X1 first random access preambles.

In an implementation, the control signaling of the first random access response or control signaling of a third random access response or a third random access response is used to indicate the first parameter.

In an implementation, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an implementation, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an implementation, X2 is a multiple of X1 when the first counter is greater than the first threshold; X2 is equal to X1 when the first counter is not greater than the first threshold.

In an implementation, X2 is a multiple of X1 when the second counter is greater than the second threshold; X2 is equal to X1 when the second counter is not greater than the second threshold.

In an implementation, when the first counter is greater than the first threshold or the second counter is greater than the second threshold, the first parameter is used to determine X2; when the first counter is not greater than the first threshold or the second counter is not greater than the second threshold, X2 is equal to X1.

In an implementation, the first threshold is configured by higher layer signaling, or the second threshold is configured by higher layer signaling, or both the first threshold and the second threshold are configured by higher layer signaling.

In an implementation, the first parameter is used to determine the first threshold or the second threshold or both the first threshold and the second threshold.

According to a second aspect, a method for a second node used for wireless communication is provided, including: performing reception of X1 first random access preambles, where X1 is a positive integer; determining, during a first time window, whether to transmit control signaling of a first random access response, where the first random access response corresponds to the X1 first random access preambles; and performing reception of X2 second random access preambles, where X2 is a positive integer greater than or equal to X1; and a first parameter is used to determine X2; or whether a first counter of a first node that transmits the X1 first random access preambles is greater than a first threshold is used to determine X2, where the first threshold is a positive integer greater than 1; or whether a second counter of a first node that transmits the X1 first random access preambles is greater than a second threshold is used to determine X2, where the second threshold is a positive integer; or whether a first counter of a first node that transmits the X1 first random access preambles is greater than a first threshold and whether a second counter of the first node is greater than a second threshold are jointly used to determine X2.

In an implementation, whether to transmit control signaling of a second random access response is determined during a second time window, where the second random access response corresponds to the X2 second random access preambles.

In an implementation, a third random access response is transmitted, where the third random access response includes at least one random access preamble identifier, and no random access preamble identifier of the at least one random access preamble identifier contained in the third random access response corresponds to a preamble index of the X1 first random access preambles.

In an implementation, the control signaling of the first random access response or control signaling of a third random access response or a third random access response is used to indicate the first parameter.

In an implementation, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an implementation, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an implementation, X2 is a multiple of X1 when the first counter is greater than the first threshold; X2 is equal to X1 when the first counter is not greater than the first threshold.

In an implementation, X2 is a multiple of X1 when the second counter is greater than the second threshold; X2 is equal to X1 when the second counter is not greater than the second threshold.

In an implementation, when the first counter is greater than the first threshold or the second counter is greater than the second threshold, the first parameter is used to determine X2; when the first counter is not greater than the first threshold or the second counter is not greater than the second threshold, X2 is equal to X1.

In an implementation, the first threshold is configured by higher layer signaling, or the second threshold is configured by higher layer signaling, or both the first threshold and the second threshold are configured by higher layer signaling.

In an implementation, the first parameter is used to determine the first threshold or the second threshold or both the first threshold and the second threshold.

According to a third aspect, a first node used for wireless communication is provided, including: a first transmitter, transmitting X1 first random access preambles, where X1 is a positive integer; a first receiver, monitoring control signaling of a first random access response during a first time window, where the first random access response corresponds to the X1 first random access preambles; a first processor, incrementing a first counter by X1, and/or increment a second counter by 1; and a second transmitter, transmitting X2 second random access preambles, where X2 is a positive integer greater than or equal to X1; and a first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In an implementation, the first receiver is further configured to monitor control signaling of a second random access response during a second time window, where the second random access response corresponds to the X2 second random access preambles.

In an implementation, the first receiver is further configured to receive a third random access response, where the third random access response includes at least one random access preamble identifier, and no random access preamble identifier of the at least one random access preamble identifier contained in the third random access response corresponds to a preamble index of the X1 first random access preambles.

In an implementation, the control signaling of the first random access response or control signaling of a third random access response or a third random access response is used to indicate the first parameter.

In an implementation, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an implementation, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an implementation, X2 is a multiple of X1 when the first counter is greater than the first threshold; X2 is equal to X1 when the first counter is not greater than the first threshold.

In an implementation, X2 is a multiple of X1 when the second counter is greater than the second threshold; X2 is equal to X1 when the second counter is not greater than the second threshold.

In an implementation, when the first counter is greater than the first threshold or the second counter is greater than the second threshold, the first parameter is used to determine X2; when the first counter is not greater than the first threshold or the second counter is not greater than the second threshold, X2 is equal to X1.

In an implementation, the first threshold is configured by higher layer signaling, or the second threshold is configured by higher layer signaling, or both the first threshold and the second threshold are configured by higher layer signaling.

In an implementation, the first parameter is used to determine the first threshold or the second threshold or both the first threshold and the second threshold.

According to a fourth aspect, a second node used for wireless communication is provided, including: a second receiver, performing reception of X1 first random access preambles, where X1 is a positive integer; a second processor, determining, during a first time window, whether to transmit control signaling of a first random access response, where the first random access response corresponds to the X1 first random access preambles; and a third receiver, performing reception of X2 second random access preambles, where X2 is a positive integer greater than or equal to X1; and a first parameter is used to determine X2; or whether a first counter of a first node that transmits the X1 first random access preambles is greater than a first threshold is used to determine X2, where the first threshold is a positive integer greater than 1; or whether a second counter of a first node that transmits the X1 first random access preambles is greater than a second threshold is used to determine X2, where the second threshold is a positive integer; or whether a first counter of a first node that transmits the X1 first random access preambles is greater than a first threshold and whether a second counter of the first node is greater than a second threshold are jointly used to determine X2.

In an implementation, the second processor is further configured to determine, during a second time window, whether to transmit control signaling of a second random access response, where the second random access response corresponds to the X2 second random access preambles.

In an implementation, the second node further includes a third transmitter, transmitting a third random access response, where the third random access response includes at least one random access preamble identifier, and no random access preamble identifier of the at least one random access preamble identifier contained in the third random access response corresponds to a preamble index of the X1 first random access preambles.

In an implementation, the control signaling of the first random access response or control signaling of a third random access response or a third random access response is used to indicate the first parameter.

In an implementation, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an implementation, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an implementation, X2 is a multiple of X1 when the first counter is greater than the first threshold; X2 is equal to X1 when the first counter is not greater than the first threshold.

In an implementation, X2 is a multiple of X1 when the second counter is greater than the second threshold; X2 is equal to X1 when the second counter is not greater than the second threshold.

In an implementation, when the first counter is greater than the first threshold or the second counter is greater than the second threshold, the first parameter is used to determine X2; when the first counter is not greater than the first threshold or the second counter is not greater than the second threshold, X2 is equal to X1.

In an implementation, the first threshold is configured by higher layer signaling, or the second threshold is configured by higher layer signaling, or both the first threshold and the second threshold are configured by higher layer signaling.

In an implementation, the first parameter is used to determine the first threshold or the second threshold or both the first threshold and the second threshold.

According to a fifth aspect, a first node used for wireless communication is provided, including a transceiver, a memory, and a processor, where the memory is configured to store a program, and the processor is configured to invoke the program in the memory, and control the transceiver to receive or transmit a signal, so that the first node executes the method according to any implementation of the third aspect.

According to a sixth aspect, a second node used for wireless communication is provided, including a transceiver, a memory, and a processor, where the memory is configured to store a program, and the processor is configured to invoke the program in the memory, and control the transceiver to receive or transmit a signal, so that the second node executes the method according to any implementation of the fourth aspect.

According to a seventh aspect, an embodiment of the present application provides a communications system, where the system includes the foregoing first node and/or the foregoing second node. In another possible design, the system may further include another device that interacts with the first node or the second node in the solution provided in this embodiment of the present application.

According to an eighth aspect, an embodiment of the present application provides a computer-readable storage medium, where the computer-readable storage medium stores a computer program, and the computer program causes the computer to perform some or all of the steps of the methods in the foregoing aspects.

According to a ninth aspect, an embodiment of the present application provides a computer program product, where the computer program product includes a non-transitory computer-readable storage medium that stores a computer program, and the computer program may operate to cause a computer to perform some or all of the steps of the methods in the foregoing aspects. In some implementations, the computer program product may be a software installation package.

According to a tenth aspect, an embodiment of the present application provides a chip, where the chip includes a memory and a processor, and the processor may invoke and run a computer program from the memory, to implement some or all of the steps of the methods in the foregoing aspects.

In embodiments of the present application, after monitoring a first random access response corresponding to X1 first random access preambles, a first node determines, based on a first parameter or a first/second counter, a quantity X2 of second random access preambles to be transmitted. It can be learned that the first node can determine a PRACH transmission quantity of a retransmission of multiple PRACH transmissions based on the first parameter or the counter, instead of directly increasing the PRACH transmission quantity. This optimizes a backoff mechanism of multiple PRACH transmissions, and helps reduce resource consumption of the retransmission of multiple PRACH transmissions.

In embodiments of the present application, when a conflict occurs during PRACH transmissions performed by a plurality of first nodes using X1 first random access preambles, X2 may be separately determined based on a first parameter or a counter, instead of being increased to an equal value. It can be learned that a probability that a plurality of first nodes select the same PRACH transmission quantity when transmitting second random access preambles is reduced, thereby avoiding or reducing a resource conflict of multiple PRACH transmissions.

In embodiments of the present application, a first node may increase a PRACH transmission quantity of multiple PRACH transmissions by using an optimized backoff mechanism, or may select to increase a PRACH transmission quantity based on the backoff mechanism, so that a retransmission of multiple PRACH transmissions can be performed with PRACH resources not used by other nodes. This not only helps improve a performance gain of multiple PRACH transmissions and enlarge a coverage area, but also helps reduce a random access delay and improve utilization efficiency of a random access resource.

DETAILED DESCRIPTION OF THE EMBODIMENTS

Architecture of a Communications System

Figure 1:
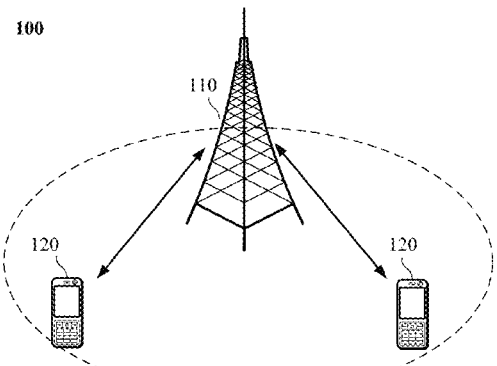
FIG. 1 is a diagram of an example of a system architecture of a wireless communications system to which an embodiment of the present application can be applied.

FIG. 1 is a diagram of an example of a system architecture of a wireless communications system 100 to which an embodiment of the present application can be applied. The wireless communications system 100 may include a network device 110 and a user equipment (UE) 120. The network device 110 may be a device that communicates with the UE 120. The network device 110 may provide communication coverage for a specific geographic area and may communicate with the UE 120 within the coverage area.

FIG. 1 exemplarily shows one network device and two UEs. Optionally, the wireless communications system 100 may include a plurality of network devices; and another quantity of UEs may be included with a coverage area of each network device, which is not limited in the embodiment of the present application.

Optionally, the wireless communications system 100 may further include other network entities, such as a network controller and a mobility management entity, which is not limited in the embodiment of the present application.

It should be understood that technical solutions of embodiments of the present application may be applied to various communications systems, for example, a fifth generation (5th generation, 5G) system or an NR system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The UE in embodiments of the present application may also be referred to as a terminal device, an access terminal, a subscriber unit, a subscriber station, a mobile site, a mobile station (MS), a mobile terminal (MT), a remote station, a remote terminal, a mobile device, a user terminal, a terminal, a wireless communications device, a user agent, a user apparatus, or the like. The UE in embodiments of the present application may be a device providing a user with voice and/or data connectivity, and may be used to connect people, objects, and machines. For example, the UE is a handheld device, a vehicle-mounted device, or the like having a wireless connection function. The UE in embodiments of the present application may be a mobile phone, a tablet computer (Pad), a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. Optionally, the UE may be used to act as a base station. For example, the UE may act as a scheduling entity, which provides a sidelink signal between UEs in V2X or D2D, or the like. For example, a cellular phone and a vehicle communicate with each other by using a sidelink signal. However, a cellular phone and a smart home device can communicate with each other without relaying of a communication signal by a base station.

The network device in embodiments of the present application may be a device for communicating with the UE. The network device may also be referred to as an access network device or a wireless access network device. For example, the network device may be a base station. The network device in embodiments of the present application may be a radio access network (RAN) node (or device) that connects the UE to a wireless network. The base station may broadly cover various names in the following, or may be interchangeable with the following names, for example: a NodeB, an evolved NodeB (eNB), a next generation NodeB (gNB), a relay station, a transmitting and receiving point (TRP), a transmitting point (TP), a master MeNB, a secondary SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that functions as a base station in device to device (D2D), vehicle-to-everything (V2X), and machine-to-machine (M2M) communications, a network-side device in a 6G network, a device that functions as a base station in a future communications system, or the like. The base station may support networks of the same or different access technologies. A specific technology and a specific device form used by the network device are not limited in embodiments of the present application.

The base station may be fixed or mobile. For example, a helicopter or a drone may be configured to act as a mobile base station, and one or more cells may move according to the position of the mobile base station. In other examples, a helicopter or a drone may be configured to serve as a device in communication with another base station.

In some deployments, the network device in embodiments of the present application may be a CU or a DU, or the network device includes a CU and a DU. The gNB may further include an AAU.

The network device and the UE may be deployed on land, including indoor, outdoor, handheld, or vehicle-mounted deployment; may be deployed on water; or may be deployed on an airplane, a balloon, or a satellite in the air. A scenario in which the network device and the UE are located is not limited in embodiments of the present application.

It should be understood that all or some of functions of the communications device in the present application may also be implemented by software functions running on hardware, or by virtualization functions instantiated on a platform (for example, a cloud platform).

It should be understood that, for the explanation of the terms (Terminology) in embodiments of the present application, reference may be made to specification protocols TS36 series, TS37 series, and TS38 series of 3GPP, and reference may also be made to specification protocols of the Institute of Electrical and Electronics Engineers (IEEE).

Coverage Enhancements of PRACH Transmissions

Coverage performance of a communications system (for example, an NR system) is an important factor that needs to be considered when an operator performs commercial deployment of a communication network, because the coverage performance of the communications system directly affects service quality of the communications system and costs of the operator, for example, capital expenditure (CAPEX) of the operator and the operating expense (OPEX) of the operator.

The coverage performance of a communications system varies with different operating frequency bands of the communications system. For example, compared with an LTE system, an operating frequency band of the NR system is higher (for example, a millimeter wave frequency band), which results in a larger path loss of the NR system, thereby resulting in poorer coverage performance of the NR system. Therefore, as a frequency band supported by a communications system may become increasingly high, how to enhance coverage of the communications system becomes a problem to be solved.

In most scenarios of practical deployment, since capability of a UE is lower than that of a network device, coverage performance of an uplink (UL) is a bottleneck of enhancing coverage of a communications system. With the development of communications technologies, uplink services in some emerging vertical use cases gradually increase, for example, in a video uploading service, in a scenario with many uplink services, how to enhance coverage of a UL is a problem that needs to be further solved.

In the related art, there has been a technical solution of a coverage enhancement for some ULs. For example, in Release 17 (Rel-17) of the NR, a coverage enhancement solution has been designed for a physical uplink shared channel (PUSCH), a physical uplink control channel (PUCCH), and a message 3 (Msg 3) in a random access procedure.

However, no coverage enhancement solution is designed for a PRACH in the Rel-17, but PRACH transmission performance is very important to many procedures such as an initial access procedure and a beam failure recovery procedure, and therefore, it is also very important to perform a coverage enhancement on a PRACH. Based on this, the 3rd generation partnership project (3GPP) formally establishes, in the Rel-18 version of the NR through a protect RP-221858, a work item (WI) of "further NR coverage enhancements", in which enhancing coverage performance of a PRACH transmission is one of the important topics of the work item.

In a possible implementation, multiple PRACH transmissions may be used to implement a coverage enhancement of PRACH transmissions. In other words, a performance gain of PRACH transmissions may be obtained through repeated PRACH transmissions (for example, a preamble is transmitted in a PRACH for a plurality of times).

To implement a coverage enhancement of PRACH transmissions, in the 3GPP radio access network (RAN) 1 #110bis-e conference, it is agreed to use multiple PRACH transmissions of the same beam in one random access channel attempt (one RACH attempt) to obtain a performance gain. In the RAN1 #110bis-e conference, it is further supported that the same PRACH preamble is used in multiple PRACH transmissions, and that physical random access channel occasions (PRACH occasions, ROs) in different time instances are used in multiple PRACH transmissions.

Further, in the 3GPP RAN1 #112 conference, it is agreed to introduce a physical random access channel occasion group (PRACH occasion group, RO group, ROG) to multiple PRACH transmissions, where all ROs in one ROG are associated with the same synchronization signal/physical broadcast channel block(s), SS/PBCH block(s), SSB(s)); and it is supported that a PRACH transmission quantity of multiple PRACH transmissions using the same beam is 2, 4, or 8.

Further, in the 3GPP RAN1 #112bis-e conference, it is agreed that multiple PRACH transmissions in one random access channel run in only one ROG. In addition, one or more values are configured for a PRACH transmission quantity of the multiple PRACH transmissions; and a quantity of valid ROs in one ROG is equal to the configured value or one of the configured values. In other words, one ROG size includes two ROs, four ROs, or eight ROs, which depends on the one or more values that are configured for the PRACH transmission quantity of the multiple PRACH transmissions.

Based on the foregoing technical progress, the following solution is discussed in a subsequent conference: carrying out a retransmission based on multiple PRACH transmissions and increasing a PRACH transmission quantity in the retransmission. For example, in the 3GPP RAN2 #122 conference, it is agreed to further discuss a backoff mechanism for changing a PRACH transmission quantity of multiple PRACH transmissions from a relatively small value to a relatively large value. For another example, in the 3GPP RAN1 #113 conference, the following solution is also discussed: performing a single PRACH transmission or multiple PRACH transmissions in an initial RACH attempt, and allowing a PRACH transmission quantity to be increased during a retransmission. In this solution, when a PRACH transmission quantity determined by a UE with a limited coverage in an initial RACH attempt cannot meet a performance requirement, a system can be quickly accessed by adjusting a PRACH transmission quantity of multiple PRACH transmissions during a retransmission. Particularly, when a PRACH transmit power of the UE reaches a maximum transmit power, and no additional power is available for enlarging a coverage area, the following is an effective solution: increasing the PRACH transmission quantity of the multiple PRACH transmissions to obtain a combined gain.

A backoff mechanism of multiple PRACH transmissions is backing off, during a retransmission of multiple PRACH transmissions, from multiple PRACH transmissions that include a relatively small quantity of PRACH transmissions to multiple PRACH transmissions that include a relatively large quantity of PRACH transmissions. For example, multiple PRACH transmissions that include two PRACH transmissions are backed off to multiple PRACH transmissions that include four PRACH transmissions. For example, multiple PRACH transmissions that include four PRACH transmissions are backed off to multiple PRACH transmissions that include eight PRACH transmissions. For still another example, multiple PRACH transmissions that include two PRACH transmissions are backed off to multiple PRACH transmissions that include eight PRACH transmissions.

In most discussions on a backoff mechanism for multiple PRACH transmissions, when current multiple PRACH transmissions fail, the UE increases a PRACH transmission quantity of the multiple PRACH transmissions. Therefore, when a plurality of UEs currently perform multiple PRACH transmissions having the same PRACH transmission quantity, these UEs may still use the same PRACH transmission quantity during next PRACH retransmissions.

Multiple PRACH transmissions having different PRACH transmission quantities are differentiated by using different PRACH resources. When a conflict occurs due to multiple PRACH transmissions that have the same PRACH transmission quantity and that are performed by a plurality of UEs, these UEs all increase the multiple PRACH transmissions to a PRACH transmission quantity the same as a next-order PRACH transmission quantity, which may cause the conflict to occur again and seriously affect access performance of a system.

In conclusion, in a scenario in which a plurality of UEs perform retransmissions of multiple PRACH transmissions based on a backoff mechanism, when a PRACH transmission quantity is changed from a relatively small value to a relatively large value, a resource conflict may be caused due to resource allocation of a retransmission of multiple PRACH transmissions, and a backoff mechanism conflict of the multiple PRACH transmissions may also be caused. This severely affects access performance of a system.

To resolve the foregoing problem, embodiments of the present application provide a method for a node used for wireless communication and an apparatus. This method optimizes a backoff mechanism of multiple PRACH transmissions, to minimize a resource conflict in a retransmission of multiple PRACH transmissions as far as possible. In addition, resource allocation is optimized, which not only increases a performance gain of the multiple PRACH transmissions and enlarges a coverage area, but also reduces a random access delay and improves utilization efficiency of a random access resource.

Embodiments of the present application may be applied to a retransmission scenario in which a single PRACH transmission or multiple PRACH transmissions are performed in an initial RACH attempt, that is, a plurality of repeated PRACH transmissions may be used in a plurality of RACH attempts of a retransmission to implement a PRACH coverage enhancement.

In some embodiments, the multiple PRACH transmissions mentioned in embodiments of the present application may refer to multiple PRACH transmissions performed by using the same beam. In this case, repeated transmissions of a plurality of PRACHs are performed on the same beam to obtain a signal-to-noise ratio gain. In some embodiments, the multiple PRACH transmissions mentioned in embodiments of the present application may refer to a plurality of PRACH transmissions performed by using different beams. In this case, repeated transmissions of a plurality of PRACHs are performed on different beams to obtain a diversity gain.

It should be noted that, the beam mentioned in embodiments of the present application may be replaced by another term, such as an antenna port, a spatial filter, and a spatial parameter, and meanings expressed by the terms may be consistent. No distinction is made between the terms in embodiments of the present application.

It should be noted that, the beams mentioned in this embodiment of the present application may include or be replaced by at least one of the following: a beam, a physical beam, a logical beam, a spatial filter, a spatial domain filter, a spatial domain transmission filter, a spatial domain reception filter, and an antenna port.

Embodiments of the present application may be applied to an initial access procedure or a beam failure recovery procedure. The initial access procedure is used as an example. Embodiments of the present application may be applied to a four-step random access procedure (namely, type-1 random access procedure), or may be applied to a two-step random access procedure (namely, type-2 random access procedure), which is not limited in embodiments of the present application.

Figure 2:
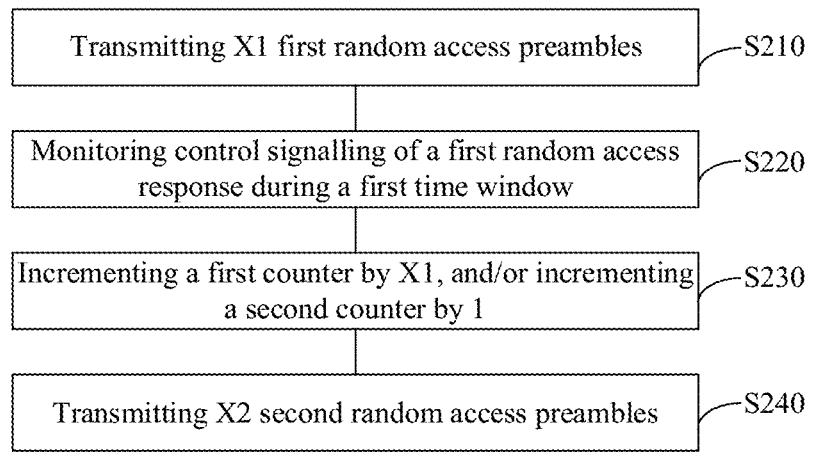
FIG. 2 is a schematic flowchart of a method for a first node used for wireless communication according to an embodiment of the present application.

The method embodiments of the present application will be described below in detail with reference to the drawings. FIG. 2 is a schematic flowchart of a method for a first node used for wireless communication according to an embodiment of the present application. The method is used for interaction between the first node and a second node.

In an embodiment, the first node may be a network-controlled repeater (NCR).

In an embodiment, the first node may be a UE, for example, the UE 120 shown in FIG. 1.

In an embodiment, the first node may be a relay, such as a relay terminal.

In an embodiment, the second node may be a network device, for example, a network device 110 shown in FIG. 2.

The method shown in FIG. 2 includes Step S210 to Step S240, and these steps will be introduced below.

In Step S210, the first node transmits X1 first random access preambles, where X1 is a positive integer.

The random access preamble (RA preamble) may be replaced with the foregoing PRACH preamble. The first random access preamble is a random access preamble generated by the first node based on a random access sequence.

In some embodiments, the first random access preamble is a random access preamble transmitted by the first node in a current random access procedure (also referred to as a random access process). The current random access procedure may also be referred to as a first random access procedure. The first random access procedure may include a plurality of RACH attempts performed by the first node. The first random access preamble is a preamble that is transmitted in a current RACH attempt.

In an embodiment, the first random access procedure includes multiple PRACH initial transmissions (namely, a first time of multiple PRACH transmissions) performed based on a backoff mechanism.

In an embodiment, the first random access procedure includes a plurality of retransmissions of multiple PRACH transmissions performed based on a backoff mechanism.

In an embodiment, the first random access procedure does not include a plurality of retransmissions of multiple PRACH transmissions performed based on a backoff mechanism.

In some embodiments, X1 represents a quantity of first random access preambles transmitted by the first node, or a quantity of first random access preambles transmitted in a current random access attempt. The quantity of first random access preambles is equivalent to a PRACH transmission quantity. For example, X1 is equal to 1. In this case, the X1 first random access preambles indicate that the first node currently performs a single PRACH transmission. For another example, X1 is a positive integer greater than 1. In this case, the X1 first random access preambles may indicate that a PRACH transmission quantity of multiple PRACH transmissions currently performed by the first node is X1, in other words, when a plurality of candidate values of X1 are all greater than 1, the first random access procedure is multiple PRACH transmissions.

In an embodiment, X1 is a positive integer greater than 1.

In an embodiment, X1 is one of {1, 2, 4}, or one of {2, 4}.

In an embodiment, X1 is equal to 2.

In an embodiment, X1 is equal to 4.

In an embodiment, the X1 first random access preambles are respectively transmitted on X1 physical random access channel occasions (ROs).

In an embodiment, the X1 physical random access channel occasions (ROs) are orthogonal in time domain.

In an embodiment, the X1 physical random access channel occasions (ROs) belong to one ROG.

In an embodiment, transmitting the X1 first random access preambles by the first node belongs to the first random access procedure.

In an embodiment, transmitting the X1 first random access preambles by the first node is an initial RACH attempt in the first random access procedure.

In an embodiment, transmitting the X1 first random access preambles by the first node is any RACH attempt in the first random access procedure.

In an embodiment, transmitting the X1 first random access preambles by the first node is one RACH attempt in the first random access procedure.

In some embodiments, the X1 first random access preambles belong to a first preamble group transmitted by the first node, that is, the first preamble group includes the X1 first random access preambles. The first preamble group may be any one of a plurality of preamble groups through which the first node performs a retransmission of multiple PRACH transmissions. Alternatively, the first preamble group may be one of a plurality of preamble groups through which the first node performs a retransmission of multiple PRACH transmissions.

In some embodiments, the first preamble group is one of Q preamble groups transmitted by the first node, where Q is a positive integer.

In an embodiment, transmitting of the Q preamble groups belongs to the first random access procedure.

In an embodiment, the X1 first random access preambles belong to one of the Q preamble groups.

In an embodiment, any preamble group of the Q preamble groups includes X1 random access preambles.

In some embodiments, the Q preamble groups transmitted by the first node use the same quantity of random access preambles, that is, the first node performs repeated transmission of Q multiple PRACH transmissions based on the same PRACH transmission quantity. For example, the Q preamble groups correspond to Q RACH attempts transmitted by the first node based on X1 random access preambles.

In an embodiment, the X1 first random access preambles are X1 random access preambles included in a preamble group of the Q preamble groups.

In an embodiment, the Q preamble groups transmitted by the first node use the same random access preambles. For example, all the Q preamble groups use first random access preambles.

In an embodiment, the Q preamble groups transmitted by the first node use different random access preambles.

In some embodiments, the first node separately performs Q transmissions of the Q preamble groups based on a specific transmit sequence. Transmitting of the X1 first random access preambles may be the first transmission, or the last transmission, or any intermediate transmission of the Q transmissions.

In an embodiment, transmitting of the X1 first random access preambles belongs to one of the Q transmissions of the Q preamble groups.

In an embodiment, Q is configured by higher layer signaling.

In an embodiment, the higher layer signaling includes at least one of radio resource control (radio resource control, RRC) layer signaling and media access control (MAC) layer signaling.

In Step S220, the first node monitors control signaling of a first random access response during a first time window.

The first time window may be a time window that is after the first node transmits the X1 first random access preambles and that is used to monitor a corresponding random access response (RAR).

In some embodiments, a start time of the first time window is related to X1 physical random access channel occasions at which the X1 first random access preambles are transmitted.

In an embodiment, the last one of the X1 physical random access channel occasions is used to determine a start of the first time window.

In an embodiment, an MAC entity may start the first time window at a first physical downlink control channel (PDCCH) occasion after a first random access preamble transmission ends.

In an embodiment, the first random access procedure includes receiving the first random access response.

In an embodiment, the first random access procedure includes monitoring the control signaling of the first random access response during the first time window. The control signaling of the first random access response may be used to transmit a random-access-related indicator to the first node. For example, the control signaling of the first random access response is used to indicate Q. For another example, the control signaling of the first random access response is used to indicate a first parameter used for determining X2.

In an embodiment, the control signaling of the first random access response includes downlink control information (DCI).

In an embodiment, the control signaling of the first random access response is transmitted on a PDCCH.

That the first random access response corresponds to the X1 first random access preambles means that the first random access response is a random access response that is transmitted by a second node for the X1 first random access preambles or by a resource related to the X1 first random access preambles, or that the first random access response is a response to transmitting of the X1 first random access preambles. For example, the first random access response is a random access response transmitted by the second node for one or more of the X1 first random access preambles. For another example, a random access preamble identifier (, RAPID) in the first random access response matches an index of the first random access preamble. For another example, at least one of the X1 physical random access channel occasions is used to scramble a cyclic redundancy check (CRC) of the control signaling of the first random access response.

In an embodiment, the first random access response is a response to a transmission of the first preamble group.

For the second node that interacts with the first node, after the reception of the X1 first random access preambles is performed, whether to transmit the first random access response is determined during the first time window. For example, the second node determines, based on a reception status of the X1 first random access preambles, whether to transmit the first random access response. For another example, the second node determines, during the first time window, whether to transmit the control signaling of the first random access response.

In an embodiment, that the second node performs the reception of the X1 first random access preambles means that the second node is to receive the random access preambles, which does not indicate that the second node can receive the X1 first random access preambles.

In some embodiments, the first random access response may include the control signaling of the first random access response. In an embodiment, the control signaling of the first random access response may be a PDCCH related to the first random access response.

In some embodiments, the first random access response further includes a random access preamble identifier. The random access preamble identifier in the first random access response is used by the first node that receives the random access response, to perform random access preamble matching.

In an embodiment, the first random access response includes at least one random access preamble identifier, and the random access preamble identifier included in the first random access response matches an index of the X1 first random access preambles.

In an embodiment, the first random access response is an RAR.

In Step S230, the first node increments a first counter by X1, and/or increments a second counter by 1.

Incrementing the first counter by X1 is equivalent to incrementing the first counter based on a quantity of transmitted random access preambles. The quantity of transmitted random access preambles is equivalent to a PRACH transmission quantity.

Incrementing the second counter by 1 is equivalent to incrementing the first counter based on a quantity of transmission times of multiple PRACH transmissions. The quantity of transmission times of multiple PRACH transmissions is related to a quantity of RACH attempts performed by the first node.

In an embodiment, an initial value of the first counter is set to X1.

In an embodiment, an initial value of the second counter is set to 1.

In some embodiments, the first counter and the second counter may be a reuse of a conventional counter by the first node, or may be a newly disposed counter, which is not limited herein.

In an embodiment, the first counter may be a newly disposed PRACH transmission counter, and the second counter may be a conventional preamble transmit counter.

In an embodiment, the first counter may be a conventional preamble transmit counter, and the second counter may be a newly disposed counter.

In some embodiments, when reception of the first random access response during the first time window fails, the first node increments the first counter or the second counter. In other words, when the reception of the first random access response fails, the first node may perform incremental counting on the first counter, or may perform incremental counting on the second counter, or may perform incremental counting on both the first counter and the second counter.

In some embodiments, when the first time window expires, if the first node has not received the first random access response corresponding to the first random access preamble or has not received any random access response, the reception of the first random access response fails.

In an embodiment, when the first time window expires, if the first node has not received, in a serving cell that transmits the first random access preamble, any PDCCH transmission on a search space, the reception of the first random access response fails.

In an embodiment, when the first time window expires, if a random access preamble identifier included in the random access response received by the first node does not match an index of a transmitted preamble, the reception of the first random access response fails.

In Step S240, X2 second random access preambles are transmitted, where X2 is a positive integer greater than or equal to X1.

In some embodiments, the first node transmits the X2 second random access preambles in a case that the reception of the first random access response fails, to enhance coverage performance of PRACH transmissions.

In an embodiment, the first random access procedure includes transmitting the X2 second random access preambles.

In an embodiment, the X2 second random access preambles are respectively transmitted on X2 physical random access channel occasions.

In an embodiment, the X2 physical random access channel occasions are orthogonal in time domain.

In an embodiment, the X2 second random access preambles are the same as the X1 first random access preambles.

In an embodiment, the X2 second random access preambles are different from the X1 first random access preambles.

In some embodiments, the X2 second random access preambles belong to a second preamble group transmitted by the first node, that is, the second preamble group includes the X2 second random access preambles. The second preamble group may be a preamble group after a first preamble group of a plurality of preamble groups through which the first node performs a retransmission of multiple PRACH transmissions.

In an embodiment, when X2 is equal to X1, the second preamble group may be a preamble group of Q preamble groups.

In an embodiment, both a transmission of the first preamble group and a transmission of the second preamble group belong to the first random access procedure.

In some embodiments, after transmitting the X2 second random access preambles, the first node may monitor a second random access response during a second time window. The following provides an exemplary description with reference to a schematic flowchart shown in FIG. 4.

The second time window may be a time window in which the first node monitors a random access response corresponding to the X2 second random access preambles.

In some embodiments, a start time of the second time window is related to X2 physical random access channel occasions at which the X2 second random access preambles are transmitted.

In an embodiment, the last one of the X2 physical random access channel occasions is used to determine a start of the second time window.

In an embodiment, an MAC entity may start the second time window at a first PDCCH occasion after a second random access preamble transmission ends.

In an embodiment, the first random access procedure includes receiving the second random access response.

In an embodiment, the first random access procedure includes monitoring control signaling of the second random access response in the second time window. The control signaling of the second random access response may be used to transmit a random-access-related indicator to the first node.

That the second random access response corresponds to the X2 second random access preambles means that the second random access response is a random access response that is transmitted by a second node for the X2 second random access preambles or by a resource related to the X2 second random access preambles.

In an embodiment, the second random access response corresponds to the second preamble group.

After performing the reception of the X2 second random access preambles, the second node determines, during the second time window, whether to transmit the control signaling of the second random access response. For example, the second node determines, based on a reception status of the X1 first random access preambles, whether to transmit the control signaling of the first random access response.

In an embodiment, that the second node performs the reception of the X1 first random access preambles means that the second node performs an action of the reception, which does not indicate that the second node can receive the X1 first random access preambles.

In some embodiments, X2 represents a quantity of second random access preambles transmitted by the first node. The quantity of second random access preambles is also equivalent to a PRACH transmission quantity. X2 is a positive integer greater than or equal to X1. It can be learned that X2 is related to X1, or X2 may be determined based on X1. For example, it may be determined whether X2 is greater than X1.

In an embodiment, X2 is greater than X1.
In an embodiment, X2 is equal to X1.

In some embodiments, a plurality of candidate integers are values in a candidate set. X1 may be determined based on a plurality of candidate integers in a first candidate set, and X2 may be determined based on a plurality of candidate integers in a second candidate set. The pluralities of candidate integers in the first candidate set and the second candidate set may be configured by an upper layer, or may be specified in a protocol, or may be determined by the first node according to an instruction of the second node.

In an embodiment, X2 is one of the plurality of candidate integers.

In some embodiments, the plurality of candidate integers of X2 include at least one candidate integer that is equal to one candidate integer of X1, to implement repeated transmissions having the same PRACH transmission quantity. Correspondingly, the plurality of candidate integers of X2 include at least one candidate integer greater than a maximum candidate integer of X1, to implement a backoff mechanism that is based on an increase of a PRACH transmission quantity.

In an embodiment, X1 is one of $\{1, 2, 4\}$, and X2 is one of $\{1, 2, 4, 8\}$.

In an embodiment, X1 is one of $\{1, 2, 4\}$, and X2 is one of $\{2, 4, 8\}$.

In an embodiment, X1 is one of $\{2, 4\}$, and X2 is one of $\{2, 4, 8\}$.

In an embodiment, X1 is one of $\{2, 4\}$, and X2 is one of $\{4, 8\}$.

In an embodiment, X1 is equal to 2, and X2 is equal to 2.
In an embodiment, X1 is equal to 4, and X2 is equal to 4.
In an embodiment, X1 is equal to 2, and X2 is equal to 4.
In an embodiment, X1 is equal to 4, and X2 is equal to 8.

In an embodiment, X1 and X2 may be determined by using the same candidate set. In other words, the plurality of candidate integers in the first candidate set are the same as those in the second candidate set. X2 is an integer greater than or equal to X1 in the candidate set.

In some embodiments, none of the plurality of candidate integers of X2 is less than X1. In other words, none of the plurality of candidate integers of X2 may be greater than X1, or may be equal to X1. For example, at least one candidate integer of the plurality of candidate integers of X2 is greater than X1. For another example, all the candidate integers of X2 are greater than X1. For another example, one candidate integer of the plurality of candidate integers of X2 is equal to X1.

In an embodiment, none of the plurality of candidate integers of X2 is not less than none of the plurality of candidate integers of X1 and is greater than X1.

In an embodiment, none of the plurality of candidate integers of X2 is not less than one candidate integer of the plurality of candidate integers of X1 and is equal to X1.

In some embodiments, X2 may be determined based on a first parameter, or may be determined based on a value/values of the first counter and/or the second counter, or may be determined based on a first parameter and a value/values of the first/second counter. The first/second counter may determine X2 based on a corresponding threshold. In other words, the first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In some embodiments, the first node may obtain the first parameter in a plurality of manners. For example, the first parameter may be configured by higher layer signaling. For another example, the control signaling of the first random access response transmitted by the second node is used to indicate the first parameter. For still another example, control signaling of a third random access response transmitted by the second node is used to indicate the first parameter. For yet another example, a third random access response transmitted by the second node is used to indicate the first parameter.

The third random access response is a random access response received by the first node in the first random access procedure. In some embodiments, the third random access response includes at least one random access preamble identifier, and no random access preamble identifier of the at least one random access preamble identifier corresponds to a preamble index of the X1 first random access preambles. In other words, the third random access response is not a random access response corresponding to the X1 first random access preambles.

In an embodiment, time at which the first node receives the third random access response is within the first time window.

In an embodiment, time at which the first node receives the third random access response is not within the first time window.

In some embodiments, the third random access response may be used to indicate a parameter related to random access performed by the first node.

In an embodiment, the third random access response is used to indicate Q of the Q preamble groups.

In an embodiment, the third random access is used to instruct the first node to perform a backoff indicator of random access.

Figure 3:
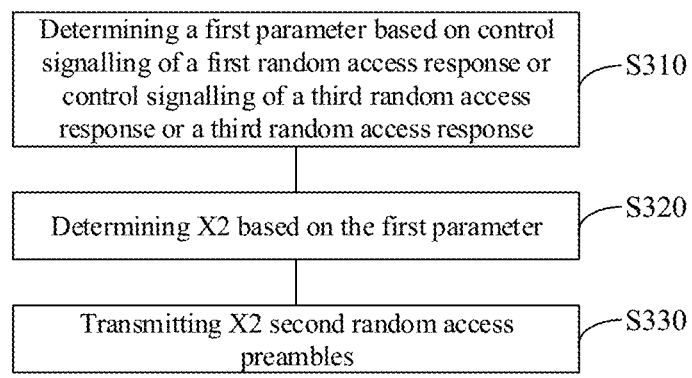
FIG. 3 is a schematic flowchart of a possible implementation of Step S240 in FIG. 2.

For ease of understanding, the following exemplarily describes a method for determining X2 based on the first parameter with reference to FIG. 3. FIG. 3 is a possible implementation of Step S240 in FIG. 2.

Referring to FIG. 3, in Step S310, the first node determines the first parameter based on the control signaling of the first random access response or control signaling of a third random access response or a third random access response.

In Step S320, the first node determines X2 based on the first parameter.

In Step S330, the first node transmits X2 second random access preambles.

In some embodiments, the first parameter is determined based on a plurality of candidate integers of X2. For example, the first parameter may be used as a random factor to determine a PRACH transmission quantity of a retransmission of multiple PRACH transmissions, which is performed by the first node based on the second random access preambles. The random factor is used to instruct the first node to randomly select one candidate integer of the plurality of candidate integers of X2 as X2. For another example, the first parameter may directly indicate a value of X2 in the plurality of candidate integers of X2.

In some embodiments, the first parameter is randomly selected from the plurality of candidate integers of X2.

In an embodiment, the plurality of candidate integers include at least one of {2, 4, 8}.

In an example, when a PRACH transmission quantity of multiple PRACH transmissions (that is, the first random access preamble) is 2, the first node may randomly select a candidate quantity in {2, 4} as a PRACH transmission quantity of multiple PRACH transmissions to be performed next time (that is, the second random access preamble), or the first node may randomly select a candidate quantity in {2, 4, 8} as a PRACH transmission quantity of multiple PRACH transmissions to be performed next time.

In another example, when a PRACH transmission quantity of multiple PRACH transmissions is 4, the first node may randomly select a candidate quantity in {4, 8} as a PRACH transmission quantity of multiple PRACH transmissions to be performed next time.

In an embodiment, the first parameter is selected as X2.

In some embodiments, the plurality of candidate integers of X2 are configured by higher layer signaling. For example, the system may configure a candidate PRACH transmission quantity of multiple PRACH transmissions performed by the first node to include {2, 4, 8}.

In an embodiment, the plurality of candidate integers are configurable.

In an embodiment, the plurality of candidate integers are preconfigured.

In some embodiments, higher layer signaling may include signaling indicated for an upper layer of a physical layer. For example, higher layer signaling may be RRC layer signaling, or may be MAC layer signaling.

In an embodiment, the plurality of candidate integers are configured by using the RRC layer signaling.

In an embodiment, the plurality of candidate integers are configured by using the MAC layer signaling.

Figure 4:
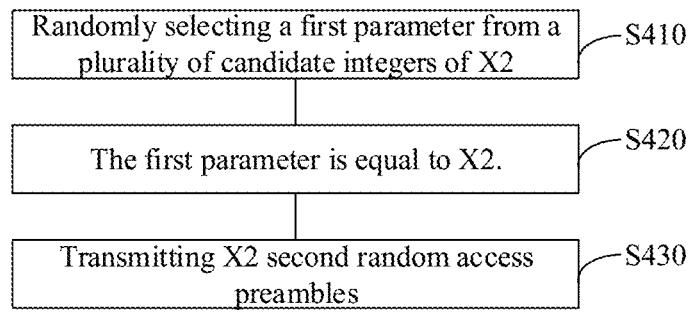
FIG. 4 is a schematic flowchart of another possible implementation of Step S240 in FIG. 2.

For ease of understanding, the following exemplarily describes another method for determining X2 based on a first parameter with reference to FIG. 4. FIG. 4 is another possible implementation of Step S240 in FIG. 2.

Referring to FIG. 4, in Step S410, the first node randomly selects the first parameter from a plurality of candidate integers of X2.

In Step S420, the first parameter is equal to X2, and X2 is determined based on the first parameter.

In Step S430, the first node transmits the X2 second random access preambles.

In some embodiments, determining X2 includes determining a value of X2, and also includes determining a value relationship between X2 and X1.

In an embodiment, that the first parameter is used to determine X2 includes X2 being equal to the first parameter, or the first parameter being an index of X2 in the plurality of candidate integers. As described above, the first parameter may be selected as X2.

In an embodiment, the first parameter may be one of {1, 2, 3, 4}. When the plurality of candidate integers of X2 are {1, 2, 4, 8}, each value in {1, 2, 3, 4} corresponds to one candidate integer. A value selected by the first parameter from the set {1, 2, 3, 4} may be used as an index of the plurality of candidate integers of X2, to determine a value of X2. For example, when the first parameter is 3, X2 is 4.

In some embodiments, the first parameter may be used to determine whether X2 is greater than X1. For example, the first parameter may indicate that X2 is equal to X1, that is, a quantity of transmitted second random access preambles is the same as a quantity of transmitted first random access preambles. For another example, the first parameter may indicate that X2 is greater than X1, to enhance coverage performance by increasing a PRACH transmission quantity.

In an embodiment, the first parameter may be used as a repetition factor to determine whether X2 is greater than X1. The first parameter that is used as a repetition factor is configured by a higher layer, or the first parameter may be one of a plurality of candidate repetition factors.

In an embodiment, the first parameter is one of {1, 2, 3, 4}. The first node randomly selects one of {1, 2, 3, 4} as a repetition factor.

In an embodiment, when the first parameter is 1 selected from {1, 2, 3, 4} as a repetition factor, X2 is greater than X1.

In an embodiment, when the first parameter is 3 selected from {1, 2, 3, 4} as a repetition factor, if a quantity of transmission times of the X1 random access preambles is less than 3, X2 is equal to X1. When the quantity of transmission times of the X1 random access preambles is equal to 3, X2 is greater than X1.

In an example, in a case that a system configures a candidate PRACH transmission quantity of multiple PRACH transmissions to include {2, 4, 8}, when a PRACH transmission quantity of initial multiple PRACH transmissions is 2, and the repetition factor is equal to 1, a PRACH transmission quantity of next multiple PRACH transmissions is 4 or 8; when a PRACH transmission quantity of initial multiple PRACH transmissions is 2, and the repetition factor is equal to X, a PRACH transmission quantity of PRACH transmissions is adjusted after multiple PRACH transmissions having a PRACH transmission quantity of 2 are transmitted repeatedly for X times.

In some embodiments, X2 is determined based on a transmit sequence of the first preamble group in the Q preamble groups. In other words, a location of a transmission of the first preamble group in Q transmissions of the Q preamble groups is used to determine X2.

In an embodiment, X2 is greater than X1 when a transmission of the first preamble group is the last one of the Q transmissions of the Q preamble groups; and X2 is equal to X1 when a transmission of the first preamble group is any one of the Q transmissions of the Q preamble groups that is different from the last one of the Q transmissions.

In some embodiments, a location of a transmission of the first preamble group in the Q transmissions of the Q preamble groups and the first parameter are jointly used to determine X2.

In an embodiment, X2 is equal to the first parameter when a transmission of the first preamble group is the last one of the Q transmissions of the Q preamble groups; and X2 is equal to X1 when a transmission of the first preamble group is any one of the Q transmissions of the Q preamble groups that is different from the last one of the Q transmissions.

Figure 5:
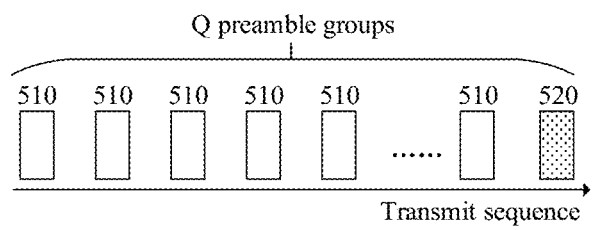
FIG. 5 is a schematic diagram of still another possible implementation of Step S240 in FIG. 2.

For ease of understanding, the following exemplarily describes a manner of determining X2 based on a transmit sequence of a plurality of preamble groups of a retransmission of multiple PRACH transmissions shown in FIG. 5. FIG. 5 is a schematic diagram of a possible implementation of Step S240 in FIG. 2.

As shown in FIG. 5, the Q preamble groups include any of a plurality of preamble groups 510 except for the last transmitted preamble group, and the last transmitted preamble group 520. When the first preamble group is the preamble group 510, X2 is equal to X1. In this case, PRACH transmissions to be performed next time use the same PRACH transmission quantity as current PRACH transmissions. When the first preamble group is the preamble group 520, X2 is greater than X1. In this case, a PRACH transmission quantity of multiple PRACH transmissions is adjusted.

In some embodiments, X2 may also be determined based on a relationship between the first counter and/or the second counter and a corresponding threshold. For example, when the first counter is greater than a first threshold, and/or when the second counter is greater than a second threshold, X2 is greater than X1.

In an embodiment, that the first counter is greater than the first threshold includes the first counter being equal to a sum of the first threshold and X1.

In an embodiment, that the second counter is greater than the second threshold includes the second counter being equal to a sum of the second threshold and 1.

In an embodiment, X2 is a multiple of X1 when the first counter is greater than the first threshold; X2 is equal to X1 when the first counter is not greater than the first threshold. It should be noted that X2 is a multiple of X1 does not include X2 being equal to X1. In other words, when X2 is a multiple of X1, the multiple is a positive integer greater than 1.

Figure 6:
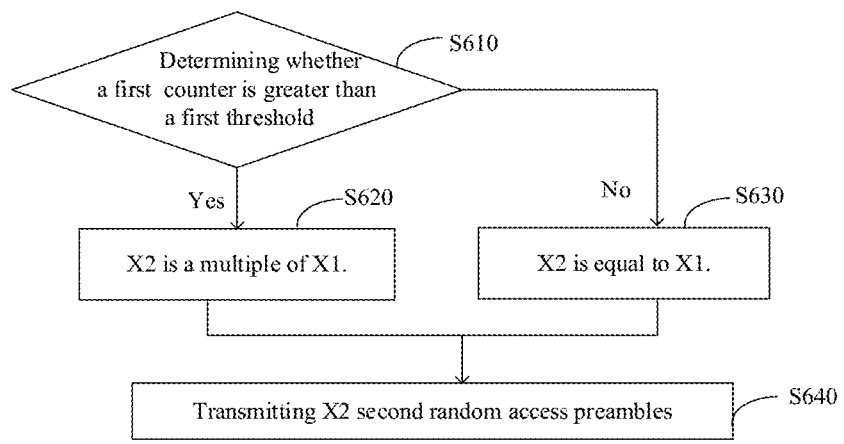
FIG. 6 is a schematic flowchart of yet another possible implementation of Step S240 in FIG. 2.

For ease of understanding, the following exemplarily describes a method for determining X2 based on the first counter and the first threshold with reference to FIG. 6. FIG. 6 is another possible implementation of Step S240 in FIG. 2.

Referring to FIG. 6, in Step S610, the first node determines whether the first counter is greater than a first threshold. Step S620 is performed if the first counter is greater than the first threshold. Step S630 is performed if the first counter is not greater than the first threshold.

In Step S620, X2 is a multiple of X1, and the first node determines X2.

In Step S630, X2 is equal to X1, and the first node determines X2.

In Step S640, the first node transmits the X2 second random access preambles.

In an embodiment, X2 is a multiple of X1 when the second counter is greater than the second threshold; X2 is equal to X1 when the second counter is not greater than the second threshold.

Figure 7:
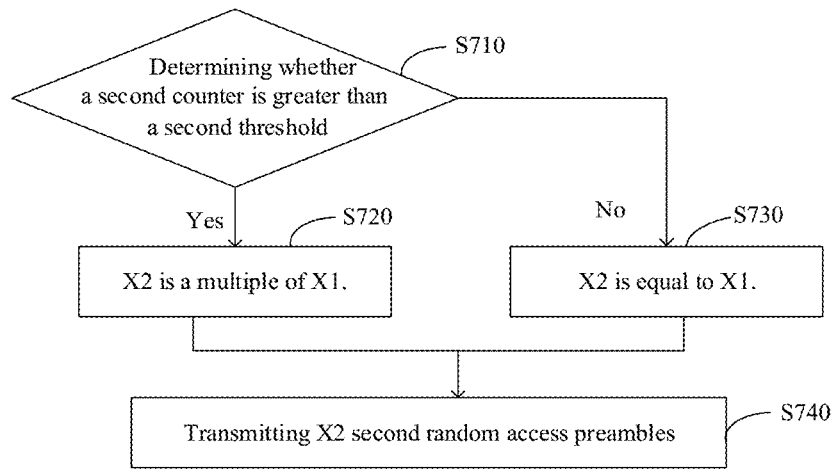
FIG. 7 is a schematic flowchart of still yet another possible implementation of Step S240 in FIG. 2.

For ease of understanding, the following exemplarily describes a method for determining X2 based on the second counter and the second threshold with reference to FIG. 7. FIG. 7 is another possible implementation of Step S240 in FIG. 2.

Referring to FIG. 7, in Step S710, the first node determines whether the second counter is greater than a second threshold. Step S720 is performed if the second counter is greater than the second threshold. Step S730 is performed if the second counter is not greater than the second threshold.

Step S720 to Step S740 are consistent with Step S620 to Step S640 in FIG. 6. Details are not described herein again.

In an embodiment, when X1 is 2, X2 is twice of X1, and may alternatively be 4 times of X1.

In some embodiments, X2 may be determined based on both the first parameter and the first counter or the second counter. For example, X2 may be obtained by determining whether to increment X1 based on a relationship between the first counter or the second counter and a corresponding threshold, and then determining a value of X2 based on the first parameter.

In an embodiment, when the first counter is greater than the first threshold, the first parameter is used to determine X2; when the first counter is not greater than the first threshold, X2 is equal to X1.

In an embodiment, when the second counter is greater than the second threshold, the first parameter is used to determine X2; when the second counter is not greater than the second threshold, X2 is equal to X1.

In an embodiment, in a case that the first node determines X2 based on the two counters, when the first counter is greater than the first threshold or the second counter is greater than the second threshold, the first parameter is used to determine X2; when the first counter is not greater than the first threshold and the second counter is not greater than the second threshold, X2 is equal to X1.

In an embodiment, when the first counter is greater than the first threshold or the second counter is greater than the second threshold, the first parameter is used to determine a multiple of X2 relative to X1.

Figure 8:
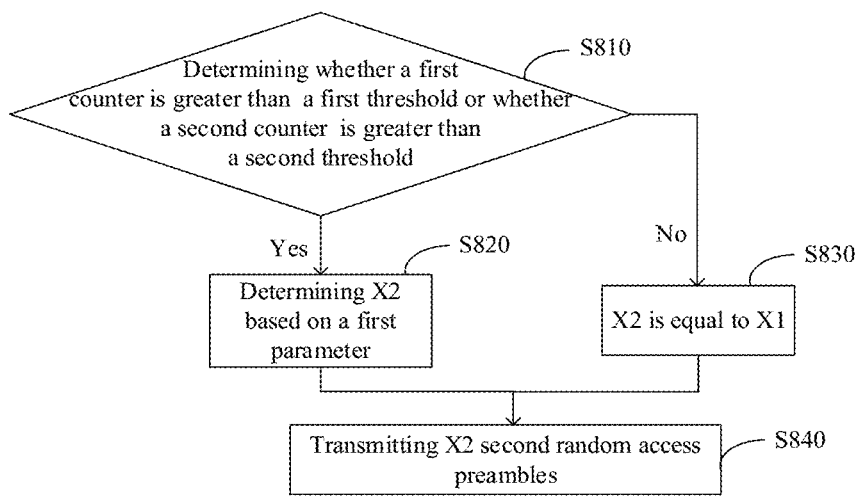
FIG. 8 is a schematic flowchart of a further possible implementation of Step S240 in FIG. 2.

For ease of understanding, the following exemplarily describes a method for determining X2 based on the first/second counter and the first parameter with reference to FIG. 8. FIG. 8 is another possible implementation of Step S240 in FIG. 2.

Referring to FIG. 8, in Step S810, the first node determines whether the first counter is greater than a first threshold or whether the second counter is greater than a second threshold. Step S820 is performed if the first counter is greater than the first threshold or the second counter is greater than the second threshold. Step S830 is performed if the first counter is not greater than the first threshold and the second counter is not greater than the second threshold.

In Step S820, X2 is determined based on the first parameter.

Step S830 and Step S840 are consistent with Step S630 and Step S640 in FIG. 6. Details are not described herein again.

In some embodiments, the first threshold is configured by higher layer signaling, or the second threshold is configured by higher layer signaling, or both the first threshold and the second threshold are configured by higher layer signaling.

In an embodiment, the first threshold is configurable.

In an embodiment, the first threshold is preconfigured.

In an embodiment, the second threshold is configurable.

In an embodiment, the second threshold is preconfigured.

In some embodiments, the first threshold is compared with a value of the first counter to determine X2. The first counter performs incremental counting based on a quantity of transmission times of a random access preamble. Therefore, accumulation of PRACH transmission quantities in a plurality of RACH attempts should be taken into consideration during (pre-) configuration of the first threshold.

In an embodiment, the first threshold is not greater than 32.

In an embodiment, the first threshold is not greater than 100.

In some embodiments, the second threshold is compared with a value of the second counter to determine X2. The second counter performs incremental counting based on 1, that is, the second counter performs an increment by 1 each time a random access preamble is transmitted. Therefore, a quantity of RACH attempts is mainly considered during (pre-) configuration of the second threshold.

In an embodiment, the second threshold is not greater than 32.

In an embodiment, the second threshold is one of {1, 2, 3, 4}.

In some embodiments, the first parameter may also be used to determine the first threshold or the second threshold or both the first threshold and the second threshold. In other words, the first parameter may be used to determine a threshold of an accumulated PRACH transmission quantity of a plurality of RACH attempts, or may be used to determine a quantity of RACH attempts.

In an embodiment, the first parameter is a backoff indicator (BI).

In an embodiment, the first parameter may reuse a backoff indicator in an RAR. The backoff indicator is re-interpreted as a quantity of repeated transmissions of multiple PRACH transmissions, that is, a quantity of repeated transmissions of multiple PRACH transmissions having the same PRACH transmission quantity is a value of a backoff indicator.

In an embodiment, when a backoff indicator in an RAR is reused, a product of the backoff indicator and a scaling factor is re-interpreted as a quantity of repeated transmissions of multiple PRACH transmissions, that is, a quantity of repeated transmissions of multiple PRACH transmissions having the same PRACH transmission quantity is a product of a value of the backoff indicator and a general scaling factor.

Figure 9:
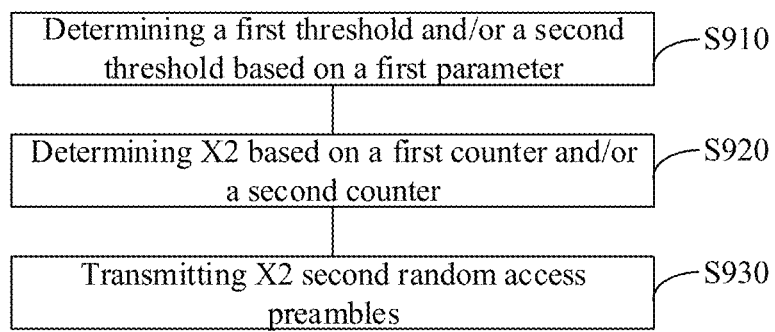
FIG. 9 is a schematic flowchart of a still further possible implementation of Step S240 in FIG. 2.

For ease of understanding, the following describes, with reference to FIG. 9, a method for determining the first threshold or the second threshold based on the first parameter and then determining X2 based on the threshold and the counter. FIG. 9 is another possible implementation of Step S240 in FIG. 2.

Referring to FIG. 9, in Step S910, a first node determines a first threshold and/or a second threshold based on a first parameter.

In Step S920, the first node determines X2 based on a first counter and/or a second counter. Reference may be made to FIG. 6 or FIG. 7.

In Step S930, the first node transmits X2 second random access preambles.

It should be noted that, in this embodiment of the present application, when X2 is determined by using different methods, the first parameter may represent different parameter types. For example, the first parameter may represent a random factor for randomly selecting X2. For another example, the first parameter may be used as a repetition factor for determining whether X2 is greater than X1. For still another example, the first parameter may be used as a reused backoff indicator. When X2 is determined according to a combination of a plurality of methods, different parameter types may be represented by different parameters.

In an embodiment, the first parameter is one of a plurality of non-negative integers. For example, when the first parameter is used as a backoff indicator, the first parameter is any value between 0 and an upper limit of indexes in a backoff parameter table.

In an embodiment, the first threshold is one of a plurality of first-type thresholds, and the first parameter is an index of the first threshold in the plurality of first-type thresholds.

In an embodiment, a plurality of first-type thresholds form a set of first thresholds. The plurality of first-type thresholds are used to limit a cumulative number of a PRACH transmission quantity for a PRACH retransmission.

In an embodiment, the plurality of first-type thresholds are used to indicate a cumulative upper limit of a PRACH transmission quantity.

In an embodiment, the plurality of first-type thresholds are respectively a plurality of positive integers.

In an embodiment, the plurality of first-type thresholds are respectively products of a plurality of positive integers and a first scaling factor.

In an embodiment, when the products of the plurality of positive integers and the first scaling factor are not integers, product results may be rounded down or rounded up, to determine the plurality of first-type thresholds.

In an implementation, the first scaling factor is one of {0, 0.5, 1}.

In an embodiment, the first parameter is an index of the first threshold in the first-type thresholds, that is, the first threshold may determine an upper limit of a corresponding PRACH transmission quantity based on an index value of the first parameter.

In an embodiment, the second threshold is one of a plurality of second-type thresholds, and the first parameter is an index of the second threshold in the plurality of second-type thresholds.

In an embodiment, the plurality of second-type thresholds form a set of second thresholds. The plurality of second-type thresholds are used to limit a cumulative number of PRACH transmissions of a PRACH retransmission.

In an embodiment, the plurality of second-type thresholds are respectively a plurality of positive integers.

In an embodiment, the plurality of second-type thresholds are respectively products of a plurality of positive integers and the first scaling factor.

In an embodiment, when the products of the plurality of positive integers and the first scaling factor are not integers, product results may be rounded down or rounded up, to determine the plurality of second-type thresholds.

In an example, the plurality of second-type thresholds are positive integers, and the first parameter is an index of the second threshold in the plurality of second-type thresholds. In this case, a correspondence between the plurality of second-type thresholds and the first parameter is shown in Table 1.

TABLE 1

| Index | Backoff Parameter Value (RACH Attempts) |
|---|---|
| 0 | 1 |
| 1 | 2 |
| 2 | 3 |
| 3 | 4 |
| 4 | 5 |
| 5 | 6 |
| 6 | 7 |
| 7 | 8 |
| 8 | 9 |
| 9 | 10 |
| 10 | 11 |
| 11 | 12 |
| 12 | 13 |
| 13 | 14 |
| 14 | 15 |
| 15 | 16 |

Table 1 is used as an example. It is assumed that a system configures a candidate PRACH transmission quantity of multiple PRACH transmissions to {2, 4, 8}. When a first parameter used as a backoff indicator is 3, a corresponding second threshold is 4. If X1 is 2, X2 is equal to 2 when the second counter is less than or equal to 4; X2 is equal to 4 or 8 when the second counter is greater than 4.

In an example, the plurality of second-type thresholds are products of a plurality of positive integers and the first scaling factor, and the first parameter is an index of the second threshold in the plurality of second-type thresholds. In this case, a correspondence between the plurality of second-type thresholds and the first parameter is shown in Table 2.

TABLE 2

| Index | Backoff Parameter Value (RACH Attempts) |
|---|---|
| 0 | 2 |
| 1 | 4 |
| 2 | 6 |
| 3 | 8 |
| 4 | 10 |
| 5 | 12 |
| 6 | 14 |
| 7 | 16 |
| 8 | 18 |
| 9 | 20 |
| 10 | 22 |
| 11 | 24 |
| 12 | 26 |
| 13 | 28 |
| 14 | 30 |
| 15 | 32 |

Table 2 is used as an example. It is assumed that a system configures a candidate PRACH transmission quantity of multiple PRACH transmissions to {2, 4, 8}. When a first parameter used as a backoff indicator is 3, a corresponding second threshold is 8. If X1 is 2, X2 is equal to 2 when the second counter is less than or equal to 8; X2 is equal to 4 or 8 when the second counter is greater than 8.

Table 2 is still used as an example. When the second-type thresholds are respectively products of a plurality of positive integers and a first scaling factor, a plurality of transmission times of multiple PRACH transmissions having the same PRACH transmission quantity change with the first scaling factor.

In an example, when the first scaling factor is 0, the multiple PRACH transmissions having the same PRACH transmission quantity are not repeatedly transmitted, that is, the PRACH transmission quantity of the multiple PRACH transmissions is adjusted in one RACH attempt.

In an example, when the first scaling factor is 0.5 and a value of the backoff indicator is 4 (index is 1), multiple PRACH transmissions having the same PRACH transmission quantity are totally transmitted for 4×0.5=2 times.

In an example, when the scaling factor is 1 and a value of the backoff indicator is 4 (index is 1), multiple PRACH transmissions having the same PRACH transmission quantity are totally transmitted for 4×1=4 times.

It may be learned from FIG. 2 to FIG. 9 that, in embodiments of the present application, the first node may determine, based on the first parameter or the first/second counter, a transmission quantity during repeated transmission of multiple PRACH transmissions. It should be understood that the methods in FIG. 3 to FIG. 9 may be used in combination without a conflict. When a plurality of first nodes use any one or more of the foregoing methods, different first nodes may adjust a quantity of multiple PRACH transmissions to different PRACH transmission quantities when repeatedly transmitting the multiple PRACH transmissions, so that separate PRACH resources are used to avoid or reduce reoccurrence of a conflict of the multiple PRACH transmissions.

A plurality of methods for determining X2 are described above with reference to FIG. 2 to FIG. 9. For ease of understanding, a possible implementation of embodiments of the present application is described below with reference to a schematic diagram, shown in FIG. 10, of interaction between a first node and a second node.

Figure 10:
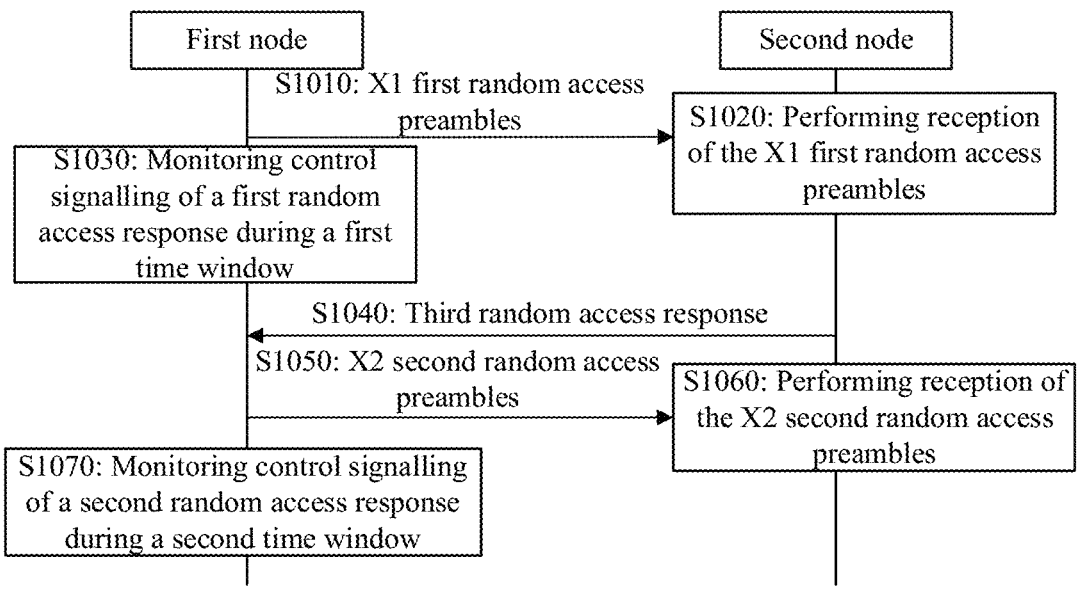
FIG. 10 is a schematic flowchart of a possible implementation of the method shown in FIG. 2.

Referring to FIG. 10, in Step S1010, the first node transmits X1 first random access preambles to the second node.

In Step S1020, the second node performs reception of the X1 first random access preambles.

In Step S1030, the first node monitors control signaling of a first random access response during a first time window.

In Step S1040, the second node transmits a third random access response to the first node.

In Step S1050, the first node transmits X2 second random access preambles. X2 may be determined based on the third random access response or a first parameter indicated by the control signaling of the first random access response.

In Step S1060, the second node performs reception of the X2 second random access preambles.

In Step S1070, the first node monitors control signaling of a second random access response during a second time window.

In some embodiments, the first node may further determine, based on first information, to enable or disable a function of repeatedly transmitting multiple PRACH transmissions having the same PRACH quantity, to help reduce resource consumption of a random access procedure.

In an embodiment, the first node receives the first information, where the first information is used to indicate whether to enable Q transmissions of the Q preamble groups.

In an embodiment, the first information is used to indicate whether to disable Q transmissions of the Q preamble groups.

In an embodiment, the first information is configured by higher layer signaling.

In an embodiment, the first information is indicated by using whether the second parameter is 0.

In an embodiment, the second parameter is the foregoing first scaling factor. Whether the function of repeatedly transmitting multiple PRACH transmissions having the same PRACH quantity is disabled is controlled by configuring a value of the first scaling factor to be 0 or not 0.

The method embodiments of the present application are described above in detail with reference to FIG. 1 to FIG. 10. Apparatus embodiments of the present application are described below in detail with reference to FIG. 11 to FIG. 14. It should be understood that the descriptions of the method embodiments correspond to the descriptions of the apparatus embodiments, and therefore, for parts that are not described in detail, reference may be made to the foregoing method embodiments.

Figure 11:
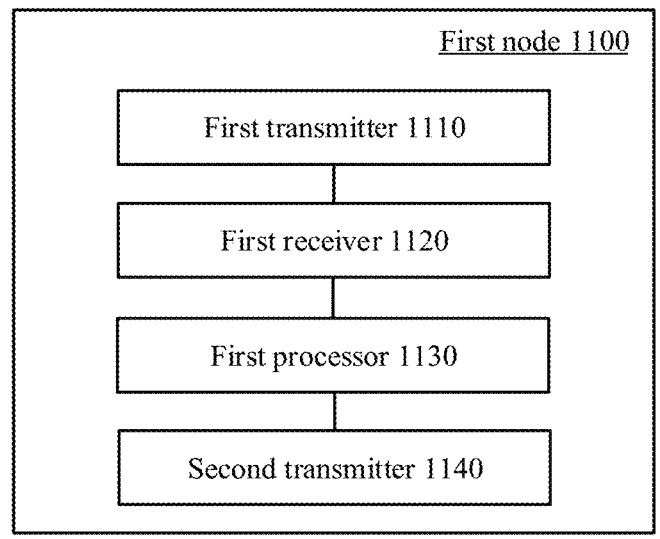
FIG. 11 is a schematic structural diagram of a first node used for wireless communication according to an embodiment of the present application.

FIG. 11 shows a first node used for wireless communication according to an embodiment of the present application. As shown in FIG. 11, the first node 1100 includes a first transmitter 1110, a first receiver 1120, a first processor 1130, and a second transmitter 1140.

The first transmitter 1110 may be configured to transmit X1 first random access preambles, where X1 is a positive integer.

The first receiver 1120 may be configured to monitor control signaling of a first random access response during a first time window, where the first random access response corresponds to the X1 first random access preambles.

The first processor 1130 may be configured to increment a first counter by X1, and/or increment a second counter by 1.

The second transmitter 1140 is configured to transmit X2 second random access preambles, where X2 is a positive integer greater than or equal to X1; and a first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In an embodiment, the first receiver 1120 is further configured to monitor control signaling of a second random access response during a second time window, where the second random access response corresponds to the X2 second random access preambles.

In an embodiment, the first receiver 1120 is further configured to receive a third random access response, where the third random access response includes at least one random access preamble identifier, and no random access preamble identifier of the at least one random access preamble identifier contained in the third random access response corresponds to a preamble index of the X1 first random access preambles.

In an embodiment, the control signaling of the first random access response or control signaling of a third random access response or a third random access response is used to indicate the first parameter.

In an embodiment, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an embodiment, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an embodiment, X2 is a multiple of X1 when the first counter is greater than the first threshold; X2 is equal to X1 when the first counter is not greater than the first threshold.

In an embodiment, X2 is a multiple of X1 when the second counter is greater than the second threshold; X2 is equal to X1 when the second counter is not greater than the second threshold.

In an embodiment, when the first counter is greater than the first threshold or the second counter is greater than the second threshold, the first parameter is used to determine X2; when the first counter is not greater than the first threshold or the second counter is not greater than the second threshold, X2 is equal to X1.

In an embodiment, the first threshold is configured by higher layer signaling, or the second threshold is configured by higher layer signaling, or both the first threshold and the second threshold are configured by higher layer signaling.

In an embodiment, the first parameter is used to determine the first threshold or the second threshold or both the first threshold and the second threshold.

Figure 13:
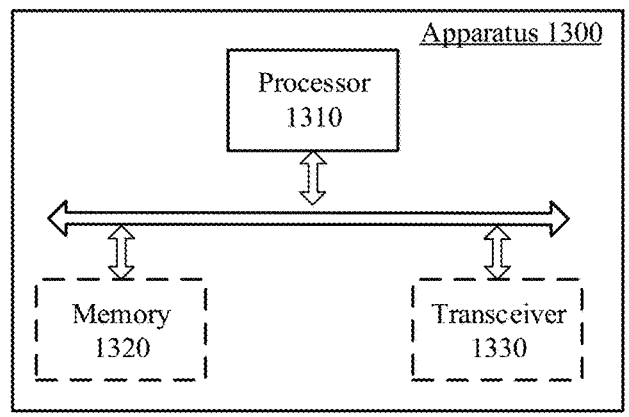
FIG. 13 is a schematic structural diagram of an apparatus according to an embodiment of the present application.

In an embodiment, all of the first transmitter 1110, the first receiver 1120, and the second transmitter 1140 may be a transceiver 1330; and the first processor 1130 may be a processor 1310. The second node 1100 may further include a memory 1320. Details are shown in FIG. 13.

Figure 12:
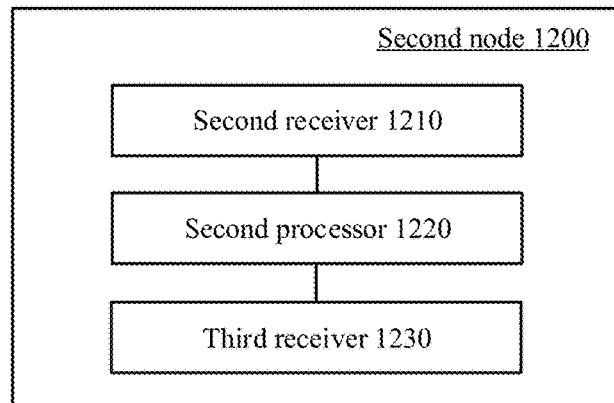
FIG. 12 is a schematic structural diagram of a second node used for wireless communication according to an embodiment of the present application.

FIG. 12 shows a second node used for wireless communication according to an embodiment of the present application. As shown in FIG. 12, the second node 1200 includes a second receiver 1210, a second processor 1220, and a third receiver 1230.

The second receiver 1210 may be configured to perform reception of X1 first random access preambles, where X1 is a positive integer.

The second processor 1220 may be configured to determine, during a first time window, whether to transmit control signaling of a first random access response, where the first random access response corresponds to the X1 first random access preambles.

The third receiver 1230 is configured to perform reception of X2 second random access preambles, where X2 is a positive integer greater than or equal to X1; and a first parameter is used to determine X2; or whether a first counter of a first node that transmits the X1 first random access preambles is greater than a first threshold is used to determine X2, where the first threshold is a positive integer greater than 1; or whether a second counter of a first node that transmits the X1 first random access preambles is greater than a second threshold is used to determine X2, where the second threshold is a positive integer; or whether a first counter of a first node that transmits the X1 first random access preambles is greater than a first threshold and whether a second counter of the first node is greater than a second threshold are jointly used to determine X2.

In an embodiment, the second processor 1220 is further configured to determine, during a second time window, whether to transmit control signaling of a second random access response, where the second random access response corresponds to the X2 second random access preambles.

In an embodiment, the second node 1200 further includes a third transmitter, may be configured to transmit a third random access response, where the third random access response includes at least one random access preamble identifier, and no random access preamble identifier of the at least one random access preamble identifier contained in the third random access response corresponds to a preamble index of the X1 first random access preambles.

In an embodiment, the control signaling of the first random access response or control signaling of a third random access response or a third random access response is used to indicate the first parameter.

In an embodiment, X2 is one of a plurality of candidate integers, none of the plurality of candidate integers is less than X1, X2 is equal to the first parameter, the first parameter is randomly selected from the plurality of candidate integers, and the plurality of candidate integers are configured by higher layer signaling.

In an embodiment, X2 is one of a plurality of candidate integers, none of the plurality of candidate integers is less than X1, and that the first parameter is used to determine X2 includes X2 being equal to the first parameter, or the first parameter being an index of X2 in the plurality of candidate integers.

In an embodiment, X2 is a multiple of X1 when the first counter is greater than the first threshold; X2 is equal to X1 when the first counter is not greater than the first threshold.

In an embodiment, X2 is a multiple of X1 when the second counter is greater than the second threshold; X2 is equal to X1 when the second counter is not greater than the second threshold.

In an embodiment, when the first counter is greater than the first threshold or the second counter is greater than the second threshold, the first parameter is used to determine X2; when the first counter is not greater than the first threshold or the second counter is not greater than the second threshold, X2 is equal to X1.

In an embodiment, the first threshold is configured by higher layer signaling, or the second threshold is configured by higher layer signaling, or both the first threshold and the second threshold are configured by higher layer signaling.

In an embodiment, the first parameter is used to determine the first threshold or the second threshold or both the first threshold and the second threshold.

In an embodiment, the second receiver 1210 and the third receiver 1230 may be a transceiver 1330, and the second processor 1220 may be a processor 1310. The second node 1200 may further include a memory 1320. Details are shown in FIG. 13.

FIG. 13 is a schematic structural diagram of a communications apparatus according to an embodiment of the present application. Dashed lines in FIG. 13 indicate that the unit or module is optional. The apparatus 1300 may be configured to implement the methods described in the foregoing method embodiments. The apparatus 1300 may be a chip, a UE, or a network device.

The apparatus 1300 may include one or more processors 1310. The processor 1310 may allow the apparatus 1300 to implement the methods described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1300 may further include one or more memories 1320. The memory 1320 stores a program that may be executed by the processor 1310 to cause the processor 1310 to perform the methods described in the foregoing method embodiments. The memory 1320 may be independent of the processor 1310 or may be integrated into the processor 1310.

The apparatus 1300 may further include a transceiver 1330. The processor 1310 may communicate with another device or chip through the transceiver 1330. For example, the processor 1310 may transmit and receive data to and from another device or chip through the transceiver 1330.

Figure 14:
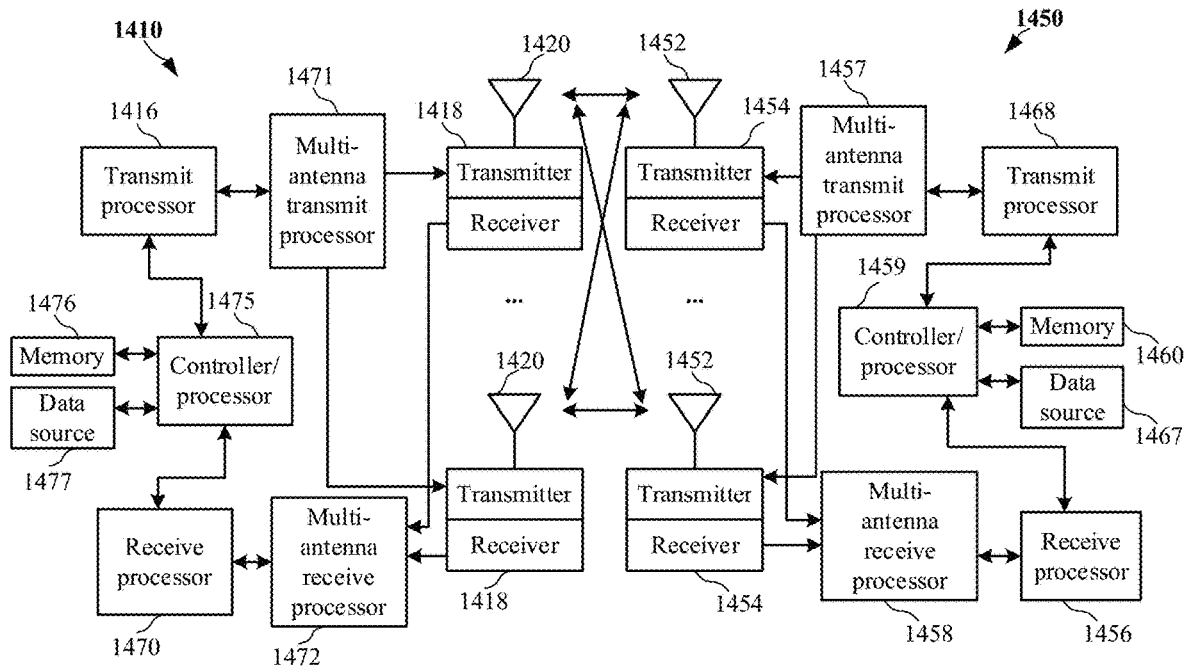
FIG. 14 is a schematic diagram of hardware modules of a communications device according to an embodiment of the present application.

FIG. 14 is a schematic diagram of hardware modules of a communications device according to an embodiment of the present application. Specifically, FIG. 14 is a block diagram of a first communications device 1450 and a second communications device 1410 communicating with each other in an access network.

The first communications device 1450 includes a controller/processor 1459, a memory 1460, a data source 1467, a transmit processor 1468, a receive processor 1456, a multi-antenna transmit processor 1457, a multi-antenna receive processor 1458, transmitters/receivers 1454, and antennas 1452.

The second communications device 1410 includes a controller/processor 1475, a memory 1476, a data source 1477, a receive processor 1470, a transmit processor 1416, a multi-antenna receive processor 1472, a multi-antenna transmit processor 1471, transmitters/receivers 1418, and antennas 1420.

During transmission from the second communications device 1410 to the first communications device 1450, at the second communications device 1410, an upper layer data packet from a core network or an upper layer data packet from the data source 1477 is provided to the controller/processor 1475. The core network and the data source 1477 represent all protocol layers above an L2 layer. The controller/processor 1475 implements functions of the L2 layer. During transmission from the second communications device 1410 to the first communications device 1450, the controller/processor 1475 provides header compression, encryption, packet segmentation and reordering, multiplexing between a logical channel and a transport channel, and allocation of radio resources of the first communications device 1450 based on various priority measurements. The controller/processor 1475 is further responsible for retransmission of a lost packet, and signaling to the first communications device 1450. The transmit processor 1416 and the multi-antenna transmit processor 1471 implement various signal processing functions of an L1 layer (namely, a physical layer). The transmit processor 1416 implements encoding and interleaving to facilitate forward error correction at the second communications device 1410, and mapping of signal clusters based on various modulation schemes (such as binary phase shift keying, quadrature phase shift keying, M-phase shift keying, and M-quadrature amplitude modulation). The multi-antenna transmit processor 1471 performs digital space pre-coding, including codebook-based pre-coding and non-codebook-based pre-coding, on a coded and modulated symbol, and beamforming processing, to generate one or more spatial streams. The transmit processor 1416 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor 1471 performs an operation of analog precoding transmitting/beamforming on the time-domain multi-carrier symbol stream. Each transmitter 1418 converts a baseband multi-carrier symbol stream provided by the multi-antenna transmit processor 1471 into a radio frequency stream, and then provides the radio frequency stream for different antennas 1420.

During transmission from the second communications device 1410 to the first communications device 1450, at the first communications device 1450, each receiver 1454 receives a signal through a corresponding antenna 1452 of the receiver 1454. Each receiver 1454 recovers information modulated onto a radio frequency carrier, converts a radio frequency stream into a baseband multi-carrier symbol stream, and provides the baseband multi-carrier symbol stream for the receive processor 1456. The receive processor 1456 and the multi-antenna receive processor 1458 implement various signal processing functions of the L1 layer. The multi-antenna receive processor 1458 performs an operation of analog precoding receiving/beamforming on the baseband multi-carrier symbol stream from the receivers 1454. The receive processor 1456 converts, from time domain to frequency domain via fast Fourier transform, the baseband multi-carrier symbol stream obtained after the operation of analog precoding receiving/beamforming. In frequency domain, a physical layer data signal and a reference signal are demultiplexed by the receive processor 1456. The reference signal is used for channel estimation; and the data signal is recovered after multi-antenna detection performed by the multi-antenna receive processor 1458, to obtain any spatial stream that uses the first communications device 1450 as a destination. Each symbol on the spatial stream is demodulated and recovered in the receive processor 1456, and generates a soft decision. The receive processor 1456 then decodes and de-interleaves the soft decision to recover upper layer data and a control signal that are transmitted by the second communications device 1410 on a physical channel. The upper layer data and the control signal are then provided to the controller/processor 1459. The controller/processor 1459 implements functions of the L2 layer. The controller/processor 1459 may be associated with the memory 1460 that stores program code and data. The memory 1460 may be referred to as a computer-readable medium. During transmission from the second communications device 1410 to the first communications device 1450, the controller/processor 1459 provides demultiplexing between a transport channel and a logical channel, packet reassembly, decryption, header decompression, and control signal processing, to recover an upper layer data packet from the second communications device 1410. The upper layer data packet is then provided to all the protocol layers above the L2 layer, or various control signals may be provided to the L3 layer for processing by the L3 layer.

During transmission from the first communications device 1450 to the second communications device 1410, at the first communications device 1450, an upper layer data packet is provided to the controller/processor 1459 by using the data source 1467. The data source 1467 represents all the protocol layers above the L2 layer. Similar to the transmit function, at the second communications device 1410, described during the transmission from the second communications device 1410 to the first communications device 1450, the controller/processor 1459 implements header compression, encryption, packet segmentation and reordering, and multiplexing between a logical channel and a transport channel, to implement an L2 layer function for a user plane and a control plane. The controller/processor 1459 is further responsible for retransmission of a lost packet, and signaling to the second communications device 1410. The transmit processor 1468 performs modulation mapping and channel coding processing, and the multi-antenna transmit processor 1457 performs digital multi-antenna spatial precoding, including codebook-based precoding and non-codebook-based precoding, and beamforming processing. Then, the transmit processor 1468 modulates a generated spatial stream into a multi-carrier/single-carrier symbol stream, and the multi-carrier/single-carrier symbol stream is provided to different antennas 1452 by using the transmitter 1454 after undergoing an analog precoding/beamforming operation in the multi-antenna transmit processor 1457. Each transmitter 1454 first converts a baseband symbol stream provided by the multi-antenna transmit processor 1457 into a radio-frequency symbol stream, and then provides the radio-frequency symbol stream for the antennas 1452.

During transmission from the first communications device 1450 to the second communications device 1410, a function at the second communications device 1410 is similar to a receive function, at the first communications device 1450, described during the transmission from the second communications device 1410 to the first communications device 1450. Each receiver 1418 receives a radio frequency signal through a corresponding antenna 1420, converts the radio frequency signal into a baseband signal, and provides the baseband signal for the multi-antenna receive processor 1472 and the receive processor 1470. The receive processor 1470 and the multi-antenna receive processor 1472 jointly implement functions of the L1 layer. The controller/processor 1475 implements functions of the L2 layer. The controller/processor 1475 may be associated with the memory 1476 that stores program code and data. The memory 1476 may be referred to as a computer-readable medium. During transmission from the first communications device 1450 to the second communications device 1410, the controller/processor 1475 provides demultiplexing between a transport channel and a logical channel, packet reassembly, decryption, header decompression, and control signal processing, to recover an upper layer data packet from the first communications device 1450. The upper layer data packet from the controller/processor 1475 may be provided to a core network or all the protocol layers above the L2 layer, or various control signals may be provided to the core network or the L3 layer for processing by the L3 layer.

In an embodiment, the first communications device 1450 includes at least one processor and at least one memory. The at least one memory includes computer program code. The at least one memory and the computer program code are configured to be used together with the at least one processor. The first communications device 1450 is at least configured to: transmit X1 first random access preambles, where X1 is a positive integer; monitor control signaling of a first random access response during a first time window, where the first random access response corresponds to the X1 first random access preambles; increment a first counter by X1, and/or increment a second counter by 1; and transmit X2 second random access preambles, where X2 is a positive integer greater than or equal to X1; and a first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In an embodiment, the first communications device 1450 includes: a memory for storing a computer-readable instruction program, where the computer-readable instruction program generates actions when being executed by the at least one processor, and the actions include: transmitting X1 first random access preambles, where X1 is a positive integer; monitoring control signaling of a first random access response during a first time window, where the first random access response corresponds to the X1 first random access preambles; incrementing a first counter by X1, and/or incrementing a second counter by 1; and transmitting X2 second random access preambles, where X2 is a positive integer greater than or equal to X1; and a first parameter is used to determine X2; or whether the first counter is greater than a first threshold is used to determine X2, where the first threshold is a positive integer greater than 1; or whether the second counter is greater than a second threshold is used to determine X2, where the second threshold is a positive integer; or whether the first counter is greater than a first threshold and whether the second counter is greater than a second threshold are jointly used to determine X2.

In an embodiment, the first communications device 1450 corresponds to a first node in the present application.

In an embodiment, the second communications device 1410 corresponds to a second node in the present application.

In an embodiment, the first communications device 1450 is a UE, and the UE may serve as a relay node.

In an embodiment, the first communications device 1450 is a UE supporting V2X, and the UE may serve as a relay node.

In an embodiment, the first communications device 1450 is a UE supporting D2D and the UE may serve as a relay node.

In an embodiment, the first communications device 1450 is a network-controlled repeater NCR.

In an embodiment, the first communications device 1450 is a relay radio repeater.

In an embodiment, the first communications device 1450 is a relay.

In an embodiment, the second communications device 1410 is a base station.

In an embodiment, the antennas 1452, the transmitters 1454, the multi-antenna transmit processor 1457, the transmit processor 1468, and the controller/processor 1459 are configured to transmit the X1 first random access preambles in the present application.

In an embodiment, the antenna 1420, the receiver 1418, the multi-antenna receive processor 1472, the receive processor 1470, and the controller/processor 1475 are configured to perform reception of the X1 first random access preambles in the present application.

In an embodiment, the antennas 1452, the receivers 1454, the multi-antenna receive processor 1458, the receive processor 1456, and the controller/processor 1459 are configured to monitor the first random access response in the present application during the first time window.

In an embodiment, the antennas 1420, the transmitters 1418, the multi-antenna transmit processor 1471, the transmit processor 1416, and the controller/processor 1475 are configured to determine whether to transmit the first random access response in the present application during the first time window.

An embodiment of the present application further provides a computer-readable storage medium for storing a program. The computer-readable storage medium may be applied to the terminal or the network device provided in embodiments of the present application, and the program causes a computer to perform the methods to be performed by the terminal or the network device in various embodiments of the present application.

An embodiment of the present application further provides a computer program product. The computer program product includes a program. The computer program product may be applied to the terminal or the network device provided in embodiments of the present application, and the program causes a computer to perform the methods to be performed by the terminal or the network device in various embodiments of the present application.

An embodiment of the present application further provides a computer program. The computer program may be applied to the terminal or the network device provided in embodiments of the present application, and the computer program causes a computer to perform the methods to be performed by the terminal or the network device in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "include" and "have" and any variations thereof are intended to cover a non-exclusive inclusion.

In embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In embodiments of the present application, "B corresponding to A" means that B is associated with A, and B may be determined based on A. It should also be understood that determining B based on A not only means that B can be determined based on only A, and but also means that B can be determined based on A and/or other information.

In embodiments of the present application, the term "correspond" may mean that there is a direct or indirect correspondence between the two, or may mean that there is an association relationship between the two, or may mean that there is a relationship such as indicating and being indicated, or configuring and being configured.

In embodiments of the present application, "predefined" or "pre-configured" may be implemented by pre-storing corresponding code, tables, or other forms that may be used to indicate related information in devices (for example, including a UE and a network device), and a specific implementation thereof is not limited in the present application. For example, being pre-defined may refer to being defined in a protocol.

In embodiments of the present application, the "protocol" may refer to a standard protocol in the communications field, and may include, for example, an LTE protocol, an NR protocol, and a related protocol applied to a future communications system, which is not limited in the present application.

In embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In embodiments of the present application, sequence numbers of the foregoing processes do not mean execution sequences. The execution sequences of the processes should be determined according to functions and internal logic of the processes, and should not be construed as any limitation on the implementation processes of embodiments of the present application.

In several embodiments provided in the present application, it should be understood that, the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected according to actual requirements to achieve the objectives of the solutions in embodiments.

In addition, functional units in embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Those of ordinary skill in the art can understand that all or some of the steps in the foregoing methods may be implemented by using a program instructing related hardware. The program may be stored in a computer-readable storage medium, such as a read-only memory, a hard disk, or a compact disc. Optionally, all or some of the steps in the foregoing embodiments may also be implemented by using one or more integrated circuits. Correspondingly, each module unit in the foregoing embodiments may be implemented in a form of hardware, or may be implemented in a form of a software function module. The present application is not limited to a combination of hardware and software in any specific form. The first node in the present application includes, but is not limited to, wireless communications devices such as a mobile phone, a tablet computer, a notebook, a prepaid Internet card, a low-power device, an enhanced machine-type communication (eMTC) device, a narrow band Internet of things (NB-IoT) device, an in-vehicle communications device, an aircraft, an airplane, a drone, and a remote control airplane. The second node in the present application includes, but is not limited to, wireless communications devices such as a mobile phone, a tablet computer, a notebook, a prepaid Internet card, a low-power device, an eMTC device, an NB-IoT device, an in-vehicle communications device, an aircraft, an airplane, a drone, and a remote control airplane. The user equipment, UE, or terminal in the present application includes, but is not limited to, wireless communications devices such as a mobile phone, a tablet computer, a notebook, a prepaid Internet card, a low-power device, an eMTC device, an NB-IoT device, an in-vehicle communications device, an aircraft, an airplane, a drone, and a remote control airplane. The base station device, base station, or network-side device in the present application includes, but is not limited to, wireless communications devices such as a macrocell, a femtocell, a home base station, a relay base station, an eNB, a gNB, a TRP, a global navigation satellite system (GNSS), a relay satellite, a satellite base station, and an air base station.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method, comprising:
    transmitting X1 first random access preambles, wherein X1 is a positive integer;
    monitoring control signaling of a first random access response during a first time window, wherein the first random access response corresponds to the X1 first random access preambles;

based on a result of the monitoring control signaling, incrementing a counter by 1; and transmitting X2 second random access preambles, wherein X2 is a positive integer, and whether X2 is greater than X1 is determined based on whether the counter is greater than a threshold, wherein the threshold is a positive integer.

2. The method according to claim 1, comprising:
monitoring control signaling of a second random access response during a second time window,
wherein the second random access response corresponds to the X2 second random access preambles.

3. The method according to claim 1, comprising:
receiving the first random access response, wherein the first random access response comprises at least one random access preamble identifier, and no random access preamble identifier of the at least one random access preamble identifier contained in the first random access response corresponds to a preamble index of the X1 first random access preambles.

4. The method according to claim 1, wherein whether X2 is greater than X1 is determined further based on a first parameter, and the first parameter is indicated by a control signaling associated with the first random access response.

5. The method according to claim 1, wherein X2 is one of a plurality of candidate integers, none of the plurality of candidate integers is less than X1, X2 is equal to a first parameter, the first parameter is selected from the plurality of candidate integers, and the plurality of candidate integers are configured by higher layer signaling.

6. The method according to claim 1, wherein X2 is one of a plurality of candidate integers, none of the plurality of candidate integers is less than X1.

7. The method according to claim 1, wherein X2 is a multiple of X1 when the counter is greater than the threshold; or X2 is equal to X1 when the counter is not greater than the threshold.

8. The method according to claim 1, wherein when the counter is greater than the threshold, a first parameter is used to determine X2; when the counter is not greater than the threshold, X2 is equal to X1.

9. The method according to claim 1, wherein the threshold is configured by higher layer signaling.

10. The method according to claim 1, wherein a first parameter is used to determine the threshold.

11. The method according to claim 1, comprising:
transmitting the first random access response, wherein the first random access response comprises at least one random access preamble identifier, and no random access preamble identifier of the at least one random access preamble identifier contained in the first random access response corresponds to a preamble index of the X1 first random access preambles.

12. The method according to claim 11, wherein whether X2 is greater than X1 is determined further based on a first parameter, and the first parameter is indicated by a control signaling associated with the first random access response.

13. A method, comprising:
receiving X1 first random access preambles, wherein X1 is a positive integer;
determining, during a first time window, whether to transmit control signaling of a first random access response, wherein the first random access response corresponds to the X1 first random access preambles;
incrementing a counter by 1; and
receiving X2 second random access preambles, wherein X2 is a positive integer, and whether X2 is greater than X1 is determined based on whether the counter is greater than a threshold, wherein the threshold is a positive integer.

14. The method according to claim 13, comprising:
determining, during a second time window, whether to transmit control signaling of a second random access response,
wherein the second random access response corresponds to the X2 second random access preambles.

15. The method according to claim 13, wherein X2 is one of a plurality of candidate integers, none of the plurality of candidate integers is less than X1, X2 is equal to a first parameter, the first parameter is selected from the plurality of candidate integers, and the plurality of candidate integers are configured by higher layer signaling.

16. A first node, comprising:
at least one processor; and
one or more non-transitory computer-readable storage media coupled to the at least one processor and storing programming instructions for execution by the at least one processor, wherein the programming instructions, when executed, cause the first node to perform operations comprising:
transmitting X1 first random access preambles, wherein X1 is a positive integer;
monitoring control signaling of a first random access response during a first time window, wherein the first random access response corresponds to the X1 first random access preambles;
based on a result of the monitoring control signaling, incrementing a counter by 1; and
transmitting X2 second random access preambles, wherein X2 is a positive integer, and whether X2 is greater than X1 is determined based on whether the counter is greater than a threshold, wherein the threshold is a positive integer.

17. The first node according to claim 16, the operations comprising:
monitoring control signaling of a second random access response during a second time window,
wherein the second random access response corresponds to the X2 second random access preambles.

18. The first node according to claim 16, the operations comprising:
receiving the first random access response, wherein the first random access response comprises at least one random access preamble identifier, and no random access preamble identifier of the at least one random access preamble identifier contained in the first random access response corresponds to a preamble index of the X1 first random access preambles.

19. The first node according to claim 16, wherein whether X2 is greater than X1 is determined further based on a first parameter, and the first parameter is indicated by a control signaling associated with the first random access response.

20. The first node according to claim 16, wherein X2 is one of a plurality of candidate integers, none of the plurality of candidate integers is less than X1, X2 is equal to a first parameter, the first parameter is selected from the plurality of candidate integers, and the plurality of candidate integers are configured by higher layer signaling.

* * * * *